US011776195B2

United States Patent
Gierach et al.

(10) Patent No.: US 11,776,195 B2
(45) Date of Patent: Oct. 3, 2023

(54) TECHNIQUES TO MANAGE EXECUTION OF DIVERGENT SHADERS

(71) Applicant: Intel Corporation, Santa Clara, CA (US)

(72) Inventors: John G. Gierach, Portland, OR (US); Karthik Vaidyanathan, San Francisco, CA (US); Thomas F. Raoux, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/463,320

(22) Filed: Aug. 31, 2021

(65) Prior Publication Data

US 2022/0068005 A1 Mar. 3, 2022

Related U.S. Application Data

(63) Continuation of application No. 16/190,021, filed on Nov. 13, 2018, now Pat. No. 11,107,263.

(51) Int. Cl.
*G06T 15/00* (2011.01)
*G06F 9/48* (2006.01)

(52) U.S. Cl.
CPC .......... *G06T 15/005* (2013.01); *G06F 9/4887* (2013.01)

(58) Field of Classification Search
CPC ... G06T 15/005; G06F 9/4887; G06F 9/4881; Y02D 10/00
See application file for complete search history.

(56) References Cited

U.S. PATENT DOCUMENTS

| 7,434,032 | B1* | 10/2008 | Coon | G06F 9/3851 712/217 |
|---|---|---|---|---|
| 11,107,263 | B2* | 8/2021 | Gierach | G06T 15/005 |
| 2009/0322751 | A1* | 12/2009 | Oneppo | G06T 15/80 345/506 |
| 2011/0022817 | A1* | 1/2011 | Gaster | G06F 9/5044 711/202 |
| 2012/0096474 | A1* | 4/2012 | Jiao | G06F 9/522 718/107 |
| 2014/0149710 | A1* | 5/2014 | Rogers | G06F 9/3887 711/170 |
| 2014/0258693 | A1* | 9/2014 | Lindholm | G06F 9/30072 712/233 |
| 2016/0019066 | A1 | 1/2016 | Diamos et al. | |

(Continued)

OTHER PUBLICATIONS

Advisory Action for U.S. Appl. No. 16/190,021, dated Oct. 19, 2020 3 pages.

(Continued)

*Primary Examiner* — Maurice L. McDowell, Jr.
(74) *Attorney, Agent, or Firm* — Compass IP Law PC

(57) ABSTRACT

Examples are described here that can be used to enable a main routine to request subroutines or other related code to be executed with other instantiations of the same subroutine or other related code for parallel execution. A sorting unit can be used to accumulate requests to execute instantiations of the subroutine. The sorting unit can request execution of a number of multiple instantiations of the subroutine corresponding to a number of lanes in a SIMD unit. A call stack can be used to share information to be accessed by a main routine after execution of the subroutine completes.

19 Claims, 38 Drawing Sheets

(56) References Cited

U.S. PATENT DOCUMENTS

| | | | |
|---|---|---|---|
| 2016/0132338 A1* | 5/2016 | Jin | G06F 9/30058 712/206 |
| 2018/0144435 A1 | 5/2018 | Chen et al. | |
| 2020/0004585 A1 | 1/2020 | Saleh et al. | |
| 2020/0081748 A1 | 3/2020 | Johnson et al. | |

OTHER PUBLICATIONS

Final Office Action for U.S. Appl. No. 16/190,021, dated Aug. 6, 2020, 15 pages.

First Office Action for U.S. Appl. No. 16/190,021, dated Feb. 19, 2020, 18 pages.

Intel, Intel Open Source HD Graphics Programmer's Reference Manual (PRM), vol. 3: GPU Overview, Jun. 2015, Revision 1.0, 35 pages.

Intel, "SIMD SIMT SMT: Parallelism In NVIDIA GUPs" http://yosef.com/blog/simd-simt-smt-parallelism-in-nvida-gpsus.html, Nov. 10, 2011, 22 pages.

Ko, "Introduction to DirectX Raytracing (DXR)—SIGGRAPH 2018"; Discussion in Rendering Technology and APIs' started by Dimitry Ko, Oct. 27, 2018 (Year: 2018).

Microsoft Windows Dev Center Callable Shader, May 31, 2018, located at: https://docs.microsoft.com/en-us/windows/win32/direct3d12/callable-shader.

Notice of Allowance for U.S. Appl. No. 16/190,021, dated Apr. 27, 2021, 11 pages.

NVIDIA Blog, "Using CUDA Warp-Level Primitives", https://devblogs.nvidia.co,/using-cuda-warp-level-primitives, downloaded Nov. 6, 2018, 10 pages.

Second Office Action for U.S. Appl. No. 16/190,021, dated Jan. 4, 2021, 15 pages.

Vaidyanathan, et al., U.S. Appl. No. 16/056,222, "Programmable Ray Tracing With Hardware Acceleration on a Graphics Processor", filed Aug. 6, 2018, 58 pages.

\* cited by examiner

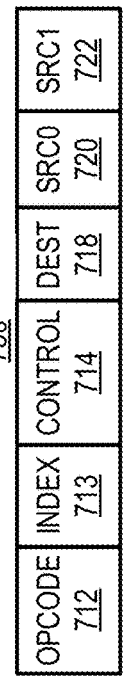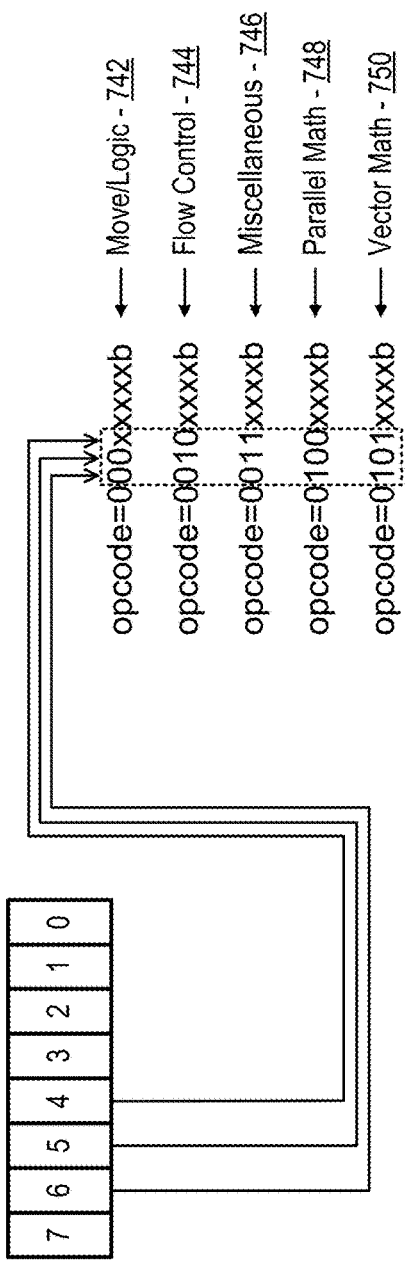
FIG. 7

Call Stack References

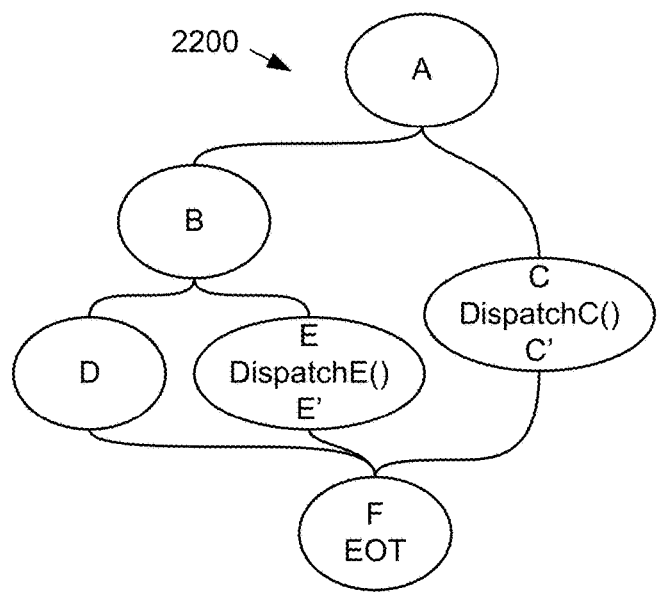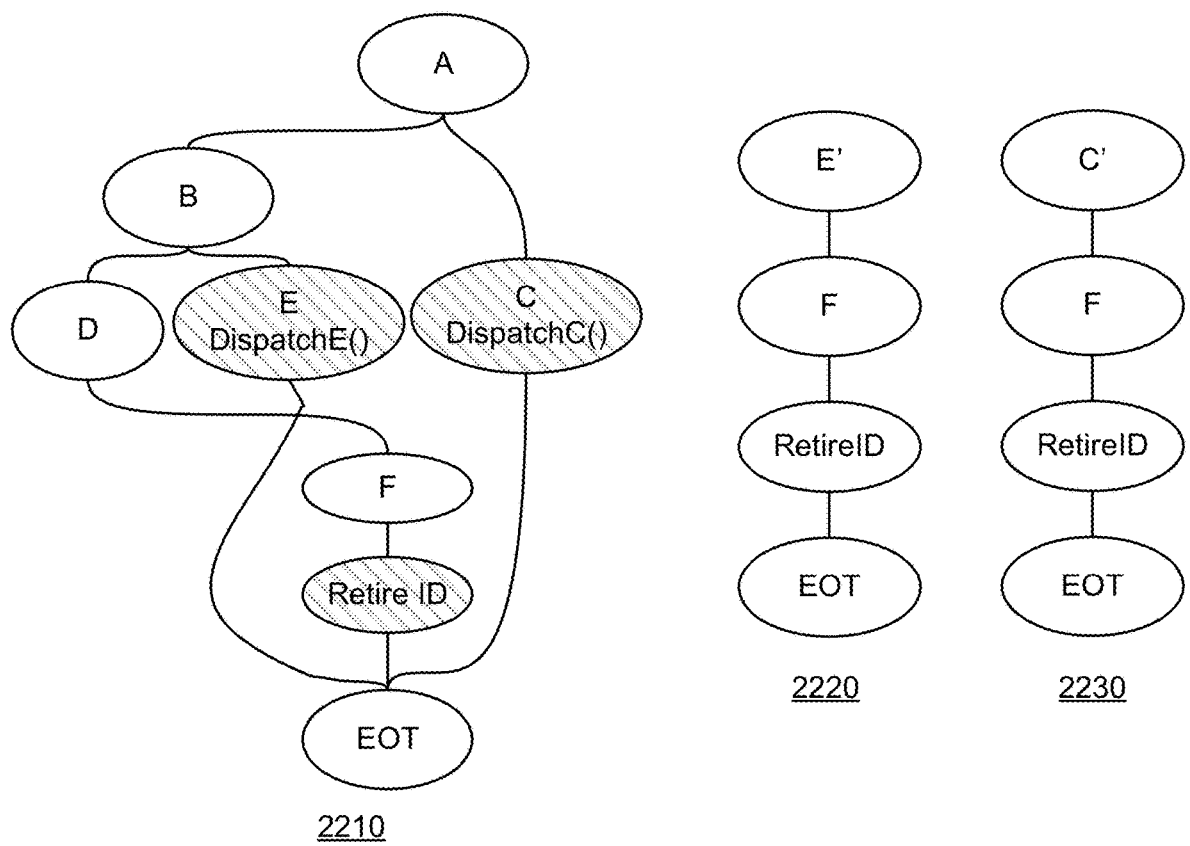
FIG. 22

Kernel A

```
[numthreads(16, 16, 1)]
void Complex_Illuminate_With_AO_CS_Kernel_0(uint3 threadID : SV_DispatchThreadID)
{
    float3 resultColor = 0.0;
        GBuffer gBuffer = LoadGBuffer(threadID);

int TileIndex = CalculateTileIndex(threadID);
    int NumLights = LoadNumCulledLights(TileIndex);

float3 illumination = 0;

__SpillLiveVariablesToCallstackMemory();
    if (gBuffer.IsAlienMaterial)
    {
        __SendMessageToShaderSorterToInvokeThread(&Complex_Illuminate_With_AO_CS_Kernel_1);
    }
    else
    {
        __SendMessageToShaderSorterToInvokeThread(&Complex_Illuminate_With_AO_CS_Kernel_2);
    }

__EndOfThread();
}
```

Kernel B

```
void Complex_Illuminate_With_AO_CS_Kernel_1()
{
    __LoadLiveRangeVariablesFromCallstackMemory();

for (int i = 0; i < NumLights; ++i)
    {
        int LightIndex = LoadLightIndex(TileIndex, i);
        LightData lightData = LoadLightData(LightIndex);

illumination += AlienMaterialLighting(gBuffer, lightData);
    }

__SpillLiveVariablesToCallstackMemory();
    __SendMessageToShaderSorterToInvokeThread(&Complex_Illuminate_With_AO_CS_Kernel_3);
    __EndOfThread();
}
```

FIG. 26A

Kernel C

```
void Complex_Illuminate_With_AO_CS_Kernel_2()
{
    __LoadLiveRangeVariablesFromCallstackMemory();

for (int i = 0; i < NumLights; ++i)
    {
        int LightIndex = LoadLightIndex(TileIndex, i);
        LightData lightData = LoadLightData(LightIndex);

illumination += PhysicallyBasedLighting(gBuffer, lightData);
    }

__SpillLiveVariablesToCallstackMemory();
    __SendMessageToShaderSorterToInvokeThread(&Complex_Illuminate_With_AO_CS_Kernel_3);
    __EndOfThread();
}
```

Kernel D

```
void Complex_Illuminate_With_AO_CS_Kernel_3()
{
    __LoadLiveRangeVariablesFromCallstackMemory();

illumination += ApplyAmbientOcclusion(gBuffer);

IlluminationOutput[screenPosition.xy] = illumination;

__EndOfThread_RetireCallstack();
}
```

| (0,0) | (1,0) | (2,0) | (3,0) |
|-------|-------|-------|-------|
| (0,1) | (1,1) | (2,1) | (3,1) |

| Append Buffer for subroutine A 2704 | ID(0,0) | ID(2,0) | ID(3,0) | ID(1,1) | ID(3,1) |

| Append Buffer for subroutine B 2706 | ID(1,0) | ID(0,1) | ID(2,1) |

FIG. 27

TECHNIQUES TO MANAGE EXECUTION OF DIVERGENT SHADERS

CROSS-REFERENCE TO RELATED APPLICATIONS

This application is a continuation of U.S. patent application Ser. No. 16/190,021, filed Nov. 13, 2018, entitled "TECHNIQUES TO MANAGE EXECUTION OF DIVERGENT SHADERS" which is related to application having Ser. No. 16/056,222, filed Aug. 6, 2018, entitled "PROGRAMMABLE RAY TRACING WITH HARDWARE ACCELERATION ON A GRAPHICS PROCESSOR," and having inventors K. Vaidyanathan et al.

FIELD

Embodiments generally to the field of graphics processors and shader execution.

RELATED ART

Digital image generation, processing, and display are widely performed and employed by computing systems and computer-executed applications. For example, smart phones, smart homes, security systems, self-driving vehicles, and computer gaming applications generate digital images or employ image processing. In some cases, two dimensional (2D) or three dimensional (3D) images are generated and displayed by a computer system.

In the field of image generation, deferred shading involves deferring or postponing rendering (e.g., lighting) applied to an image to a later time or stage. Deferred shading consists of a geometry pass to render the scene and retrieval of geometric information from objects stored in a collection of textures (e.g., position vectors, color vectors, normal vectors and/or specular values). Geometric information of a scene is used for the determining and applying lighting to the image.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 22 depicts an example of manner of transforming a primary shader into three callable shaders for a shader;

FIGS. 26A and 26B show generated kernels;

FIG. 27 depicts an example array of pixels over which a main shader can be applied;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
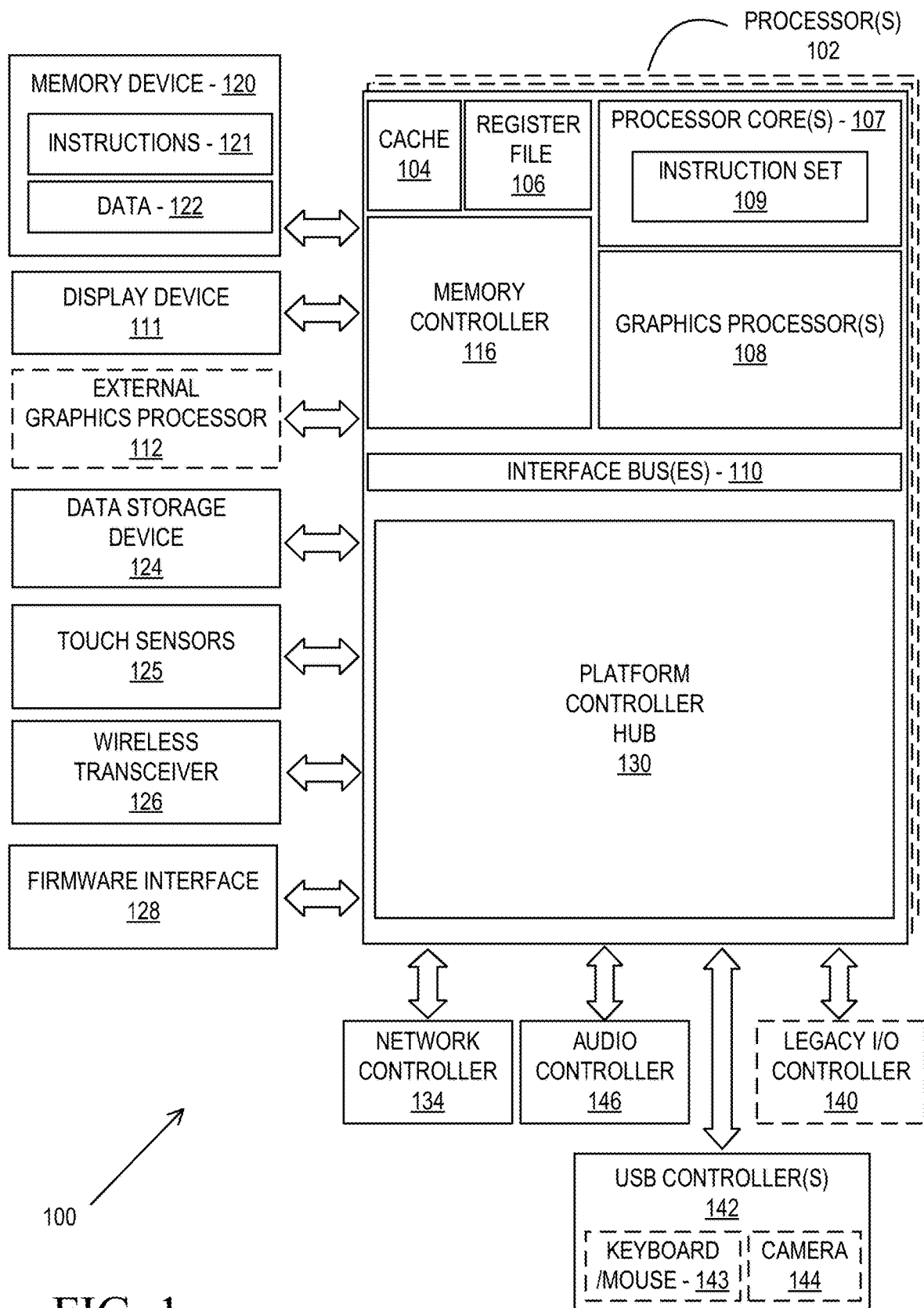
FIG. 1 is a block diagram of an embodiment of a computer system with a processor having one or more processor cores and graphics processors.

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device.

In an embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 1160 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 2:
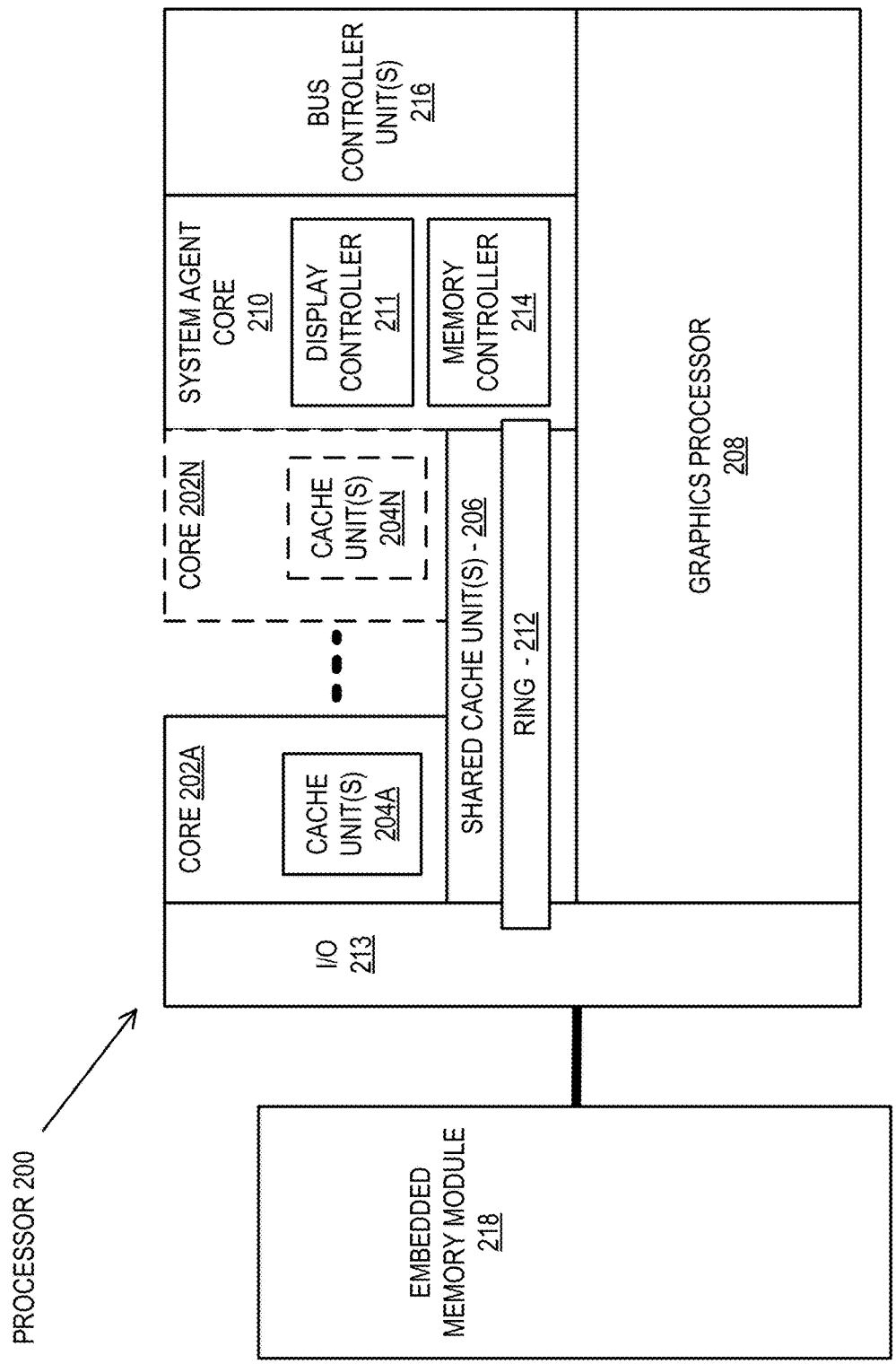
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other FIG. herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
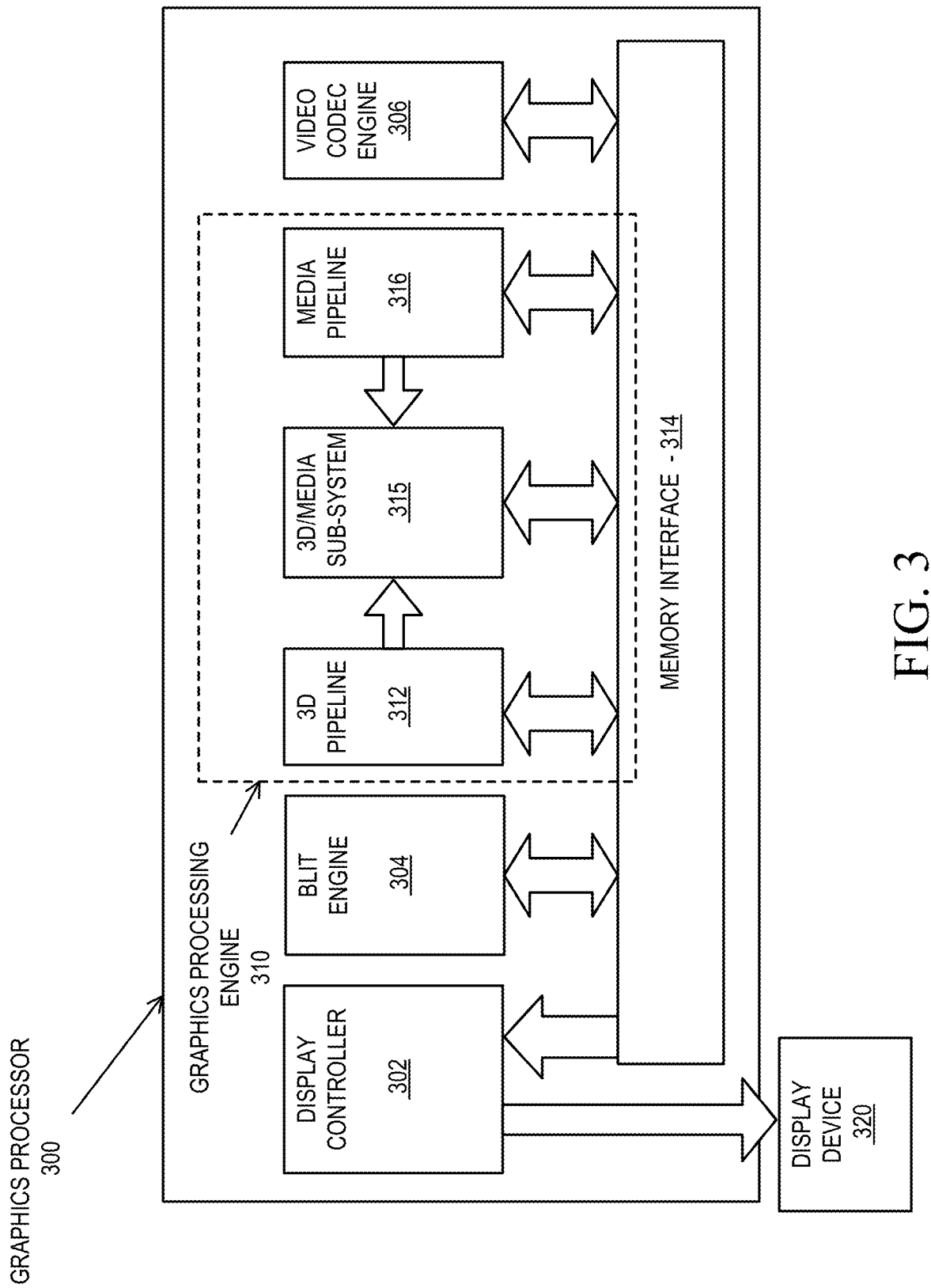
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
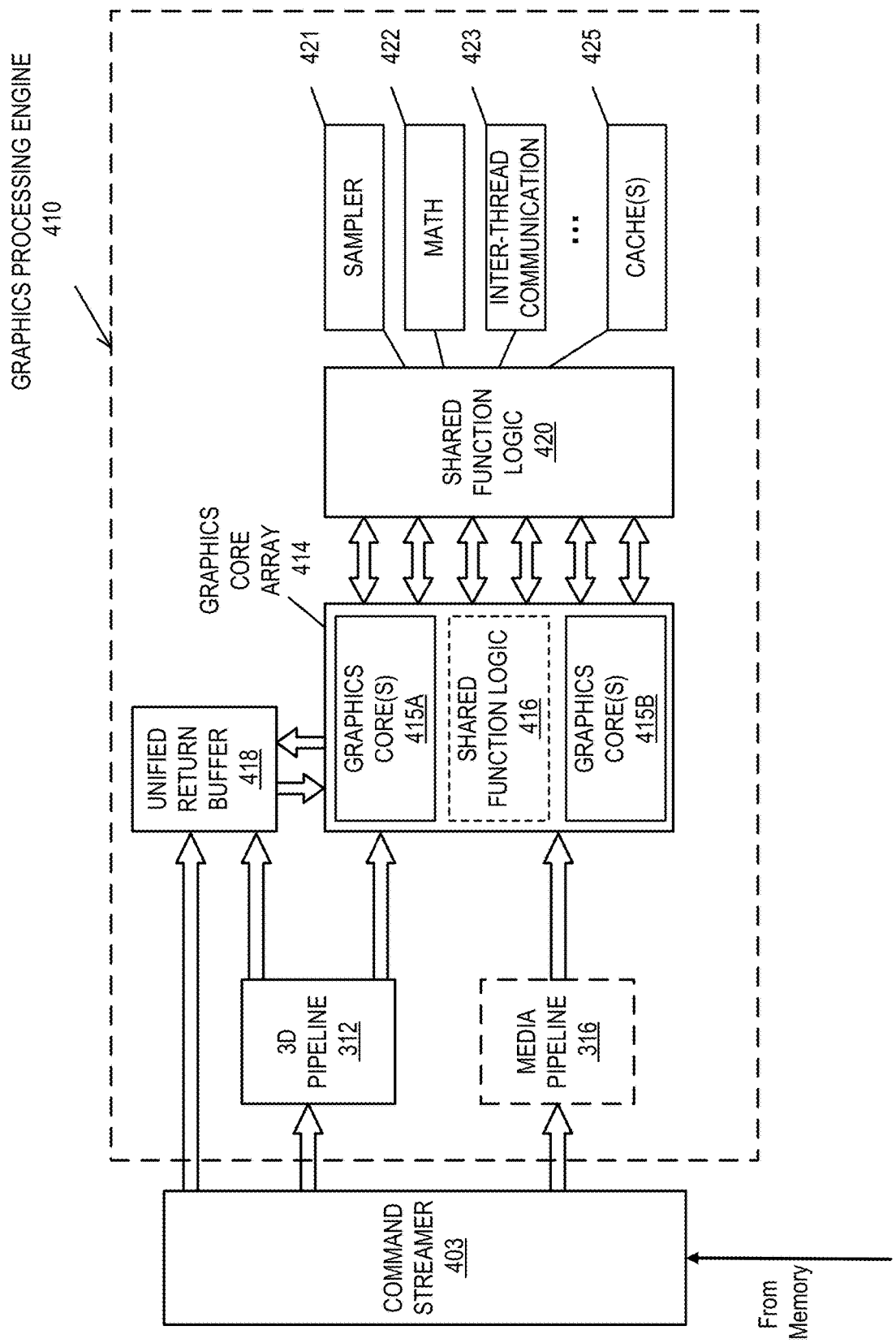
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other FIG. herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
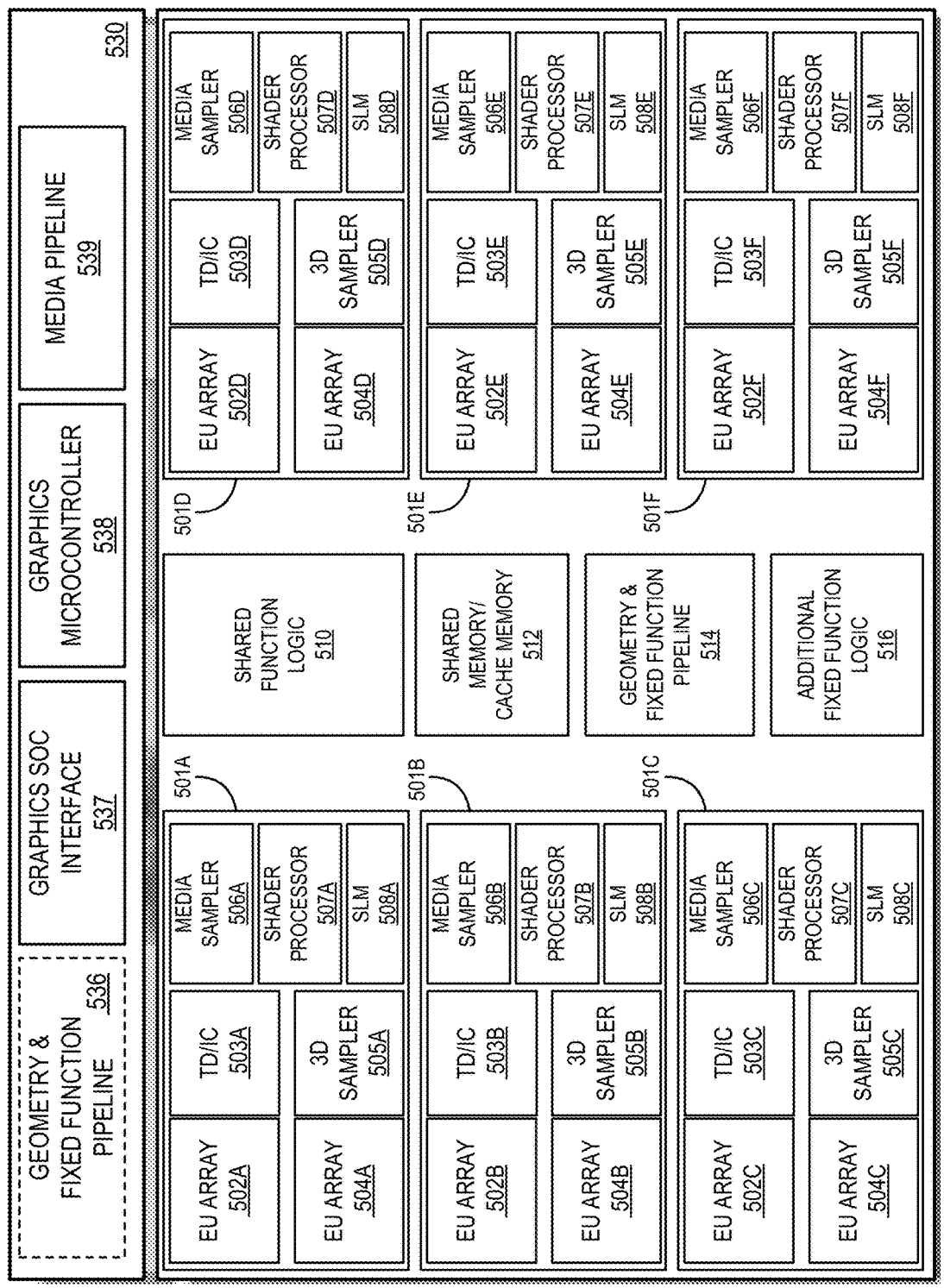
FIG. 5 is a block diagram of another embodiment of a graphics processor.

FIG. 5 is a block diagram of hardware logic of a graphics processor core 500, according to some embodiments described herein. Elements of FIG. 5 having the same reference numbers (or names) as the elements of any other FIG. herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics processor core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor core 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics processor core 500 and other processor cores within a system on a chip integrated circuit. The graphics microcontroller 538 is a programmable sub-processor that is configurable to manage various functions of the graphics processor core 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics processor core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics processor core 500 and CPUs within the SoC. The SoC interface 537 can also implement power management controls for the graphics processor core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics processor core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics processor core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics processor core 500, providing the graphics processor core 500 with the ability to save and restore registers within the graphics processor core 500 across low-power state transitions independently from the operating system and/or graphics driver software on the system.

The graphics processor core 500 may have greater than or fewer than the illustrated sub-cores 501A-501F, up to N modular sub-cores. For each set of N sub-cores, the graphics processor core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics processor core 500. The shared and/or cache memory 512 can be a last-level cache for the set of N sub-cores 501A-501F within the graphics processor core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics processor core 500 includes additional fixed function logic 516 that can include various fixed function acceleration logic for use by the graphics processor core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
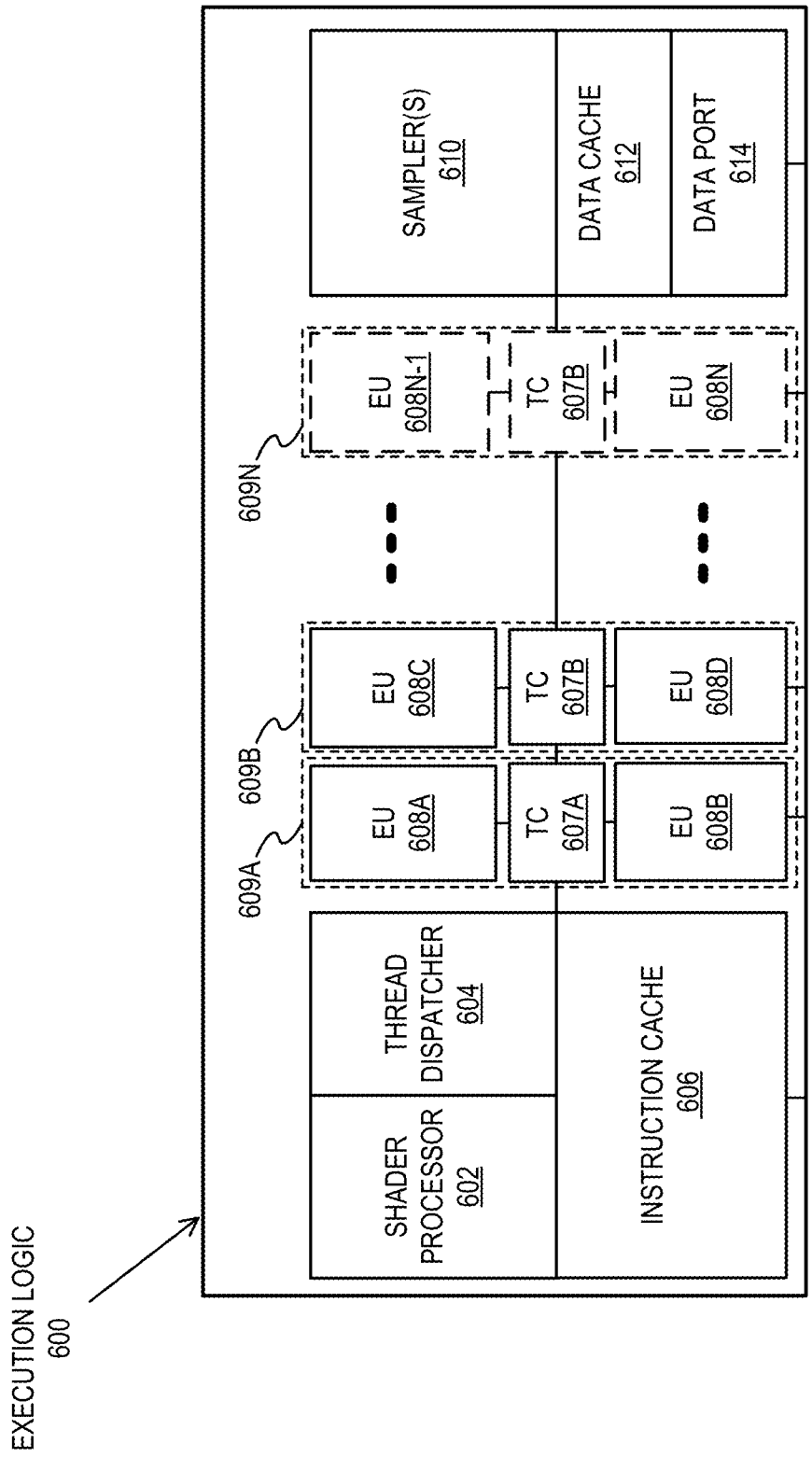
FIGS. 6A and 6B are block diagrams of thread execution logic including an array of processing elements.
Figure 6B:
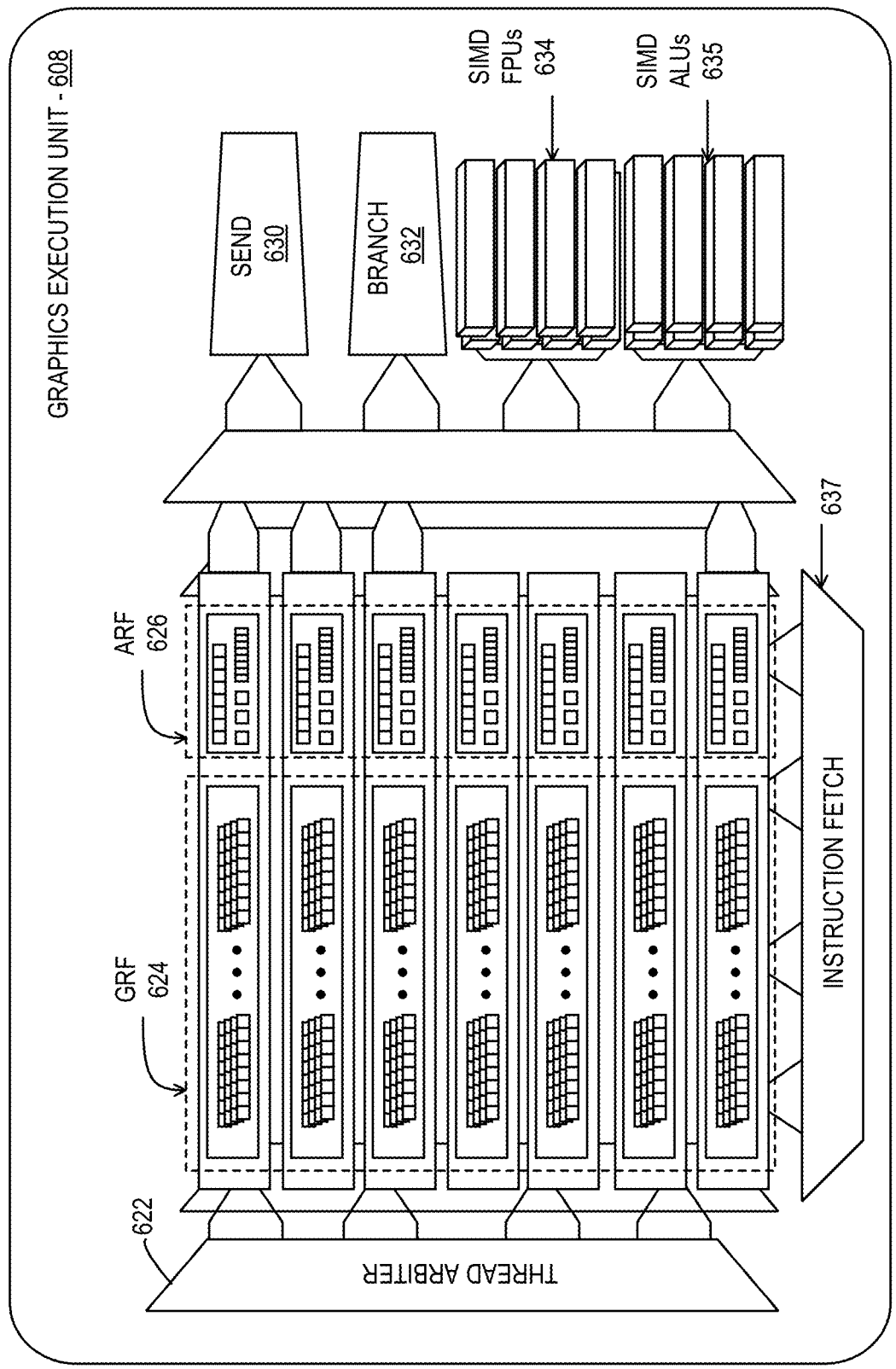

FIGS. 6A-6B illustrate thread execution logic 600 including an array of processing elements employed in a graphics processor core according to embodiments described herein. Elements of FIGS. 6A-6B having the same reference numbers (or names) as the elements of any other FIG. herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi- Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 6342, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can choose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments, instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
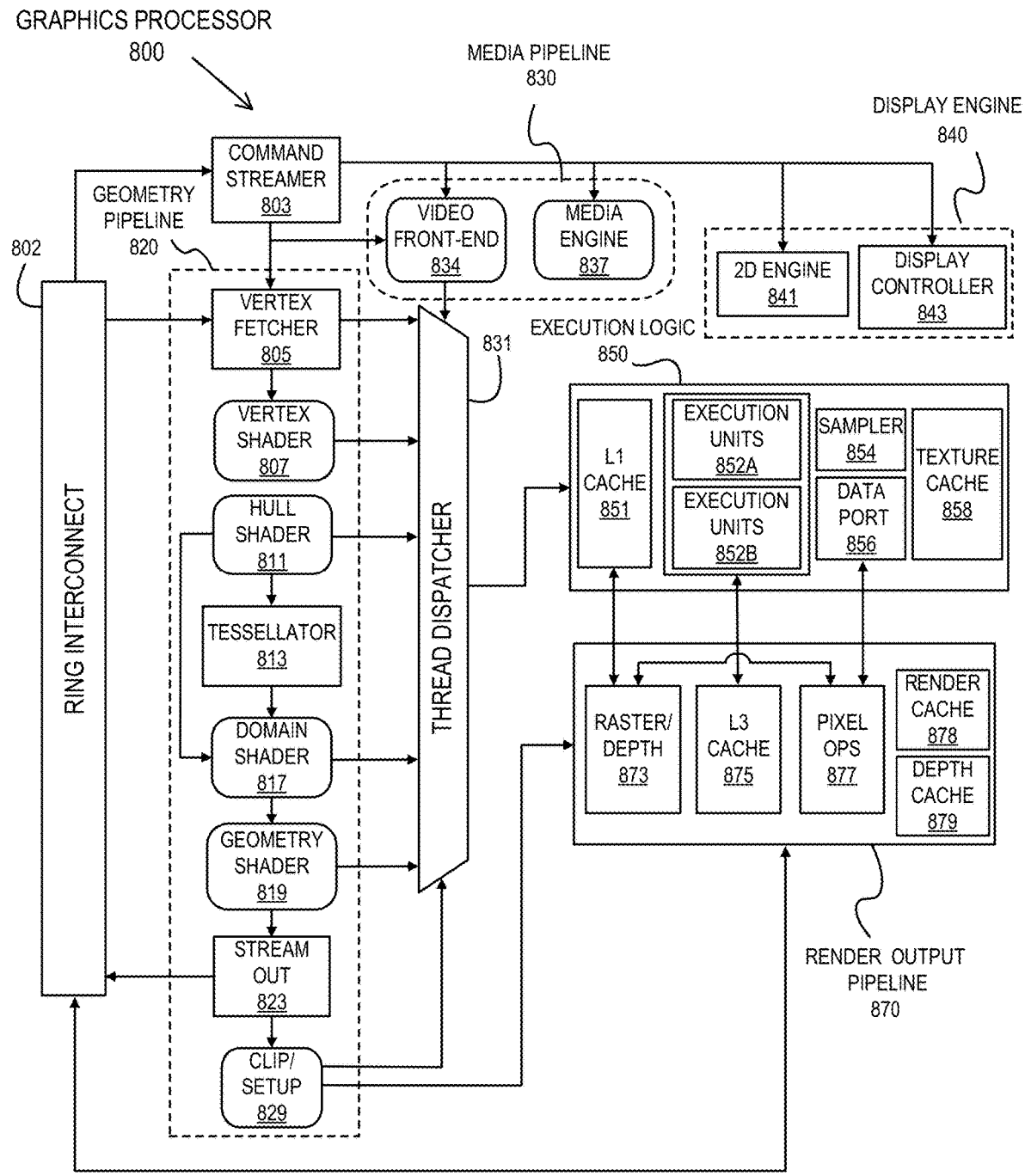
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other FIG. herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled, the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834.

In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
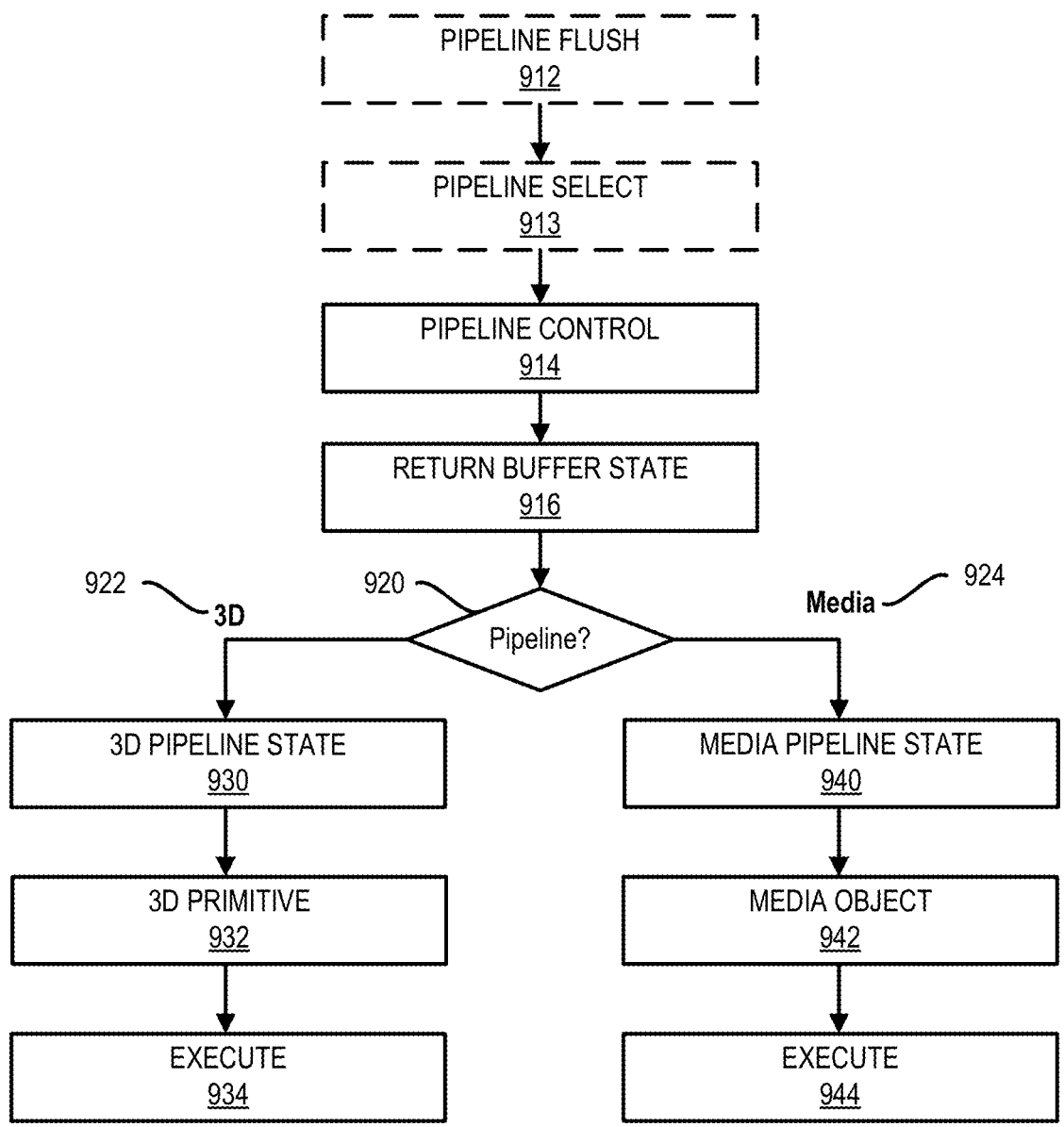
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments, execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
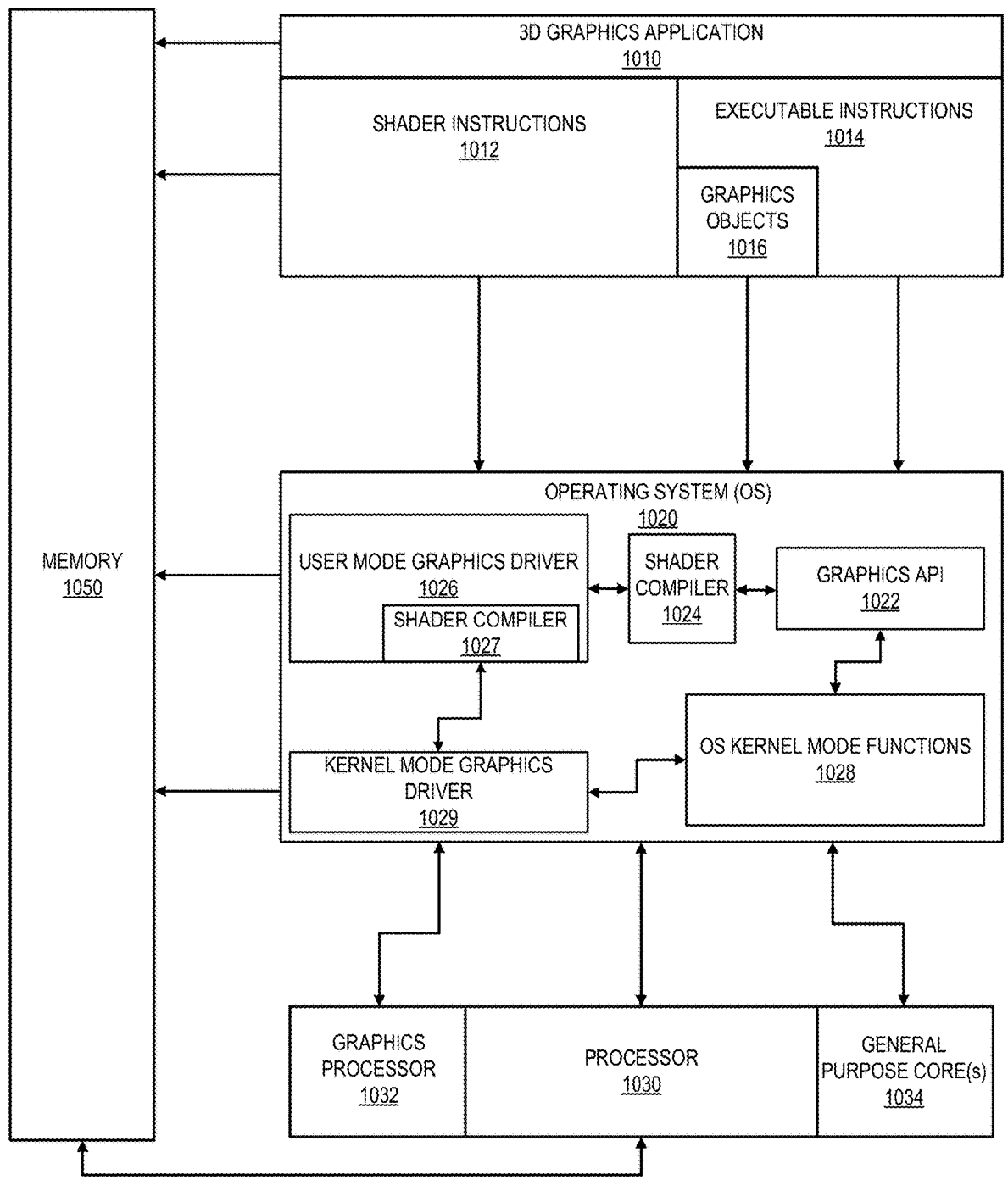
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
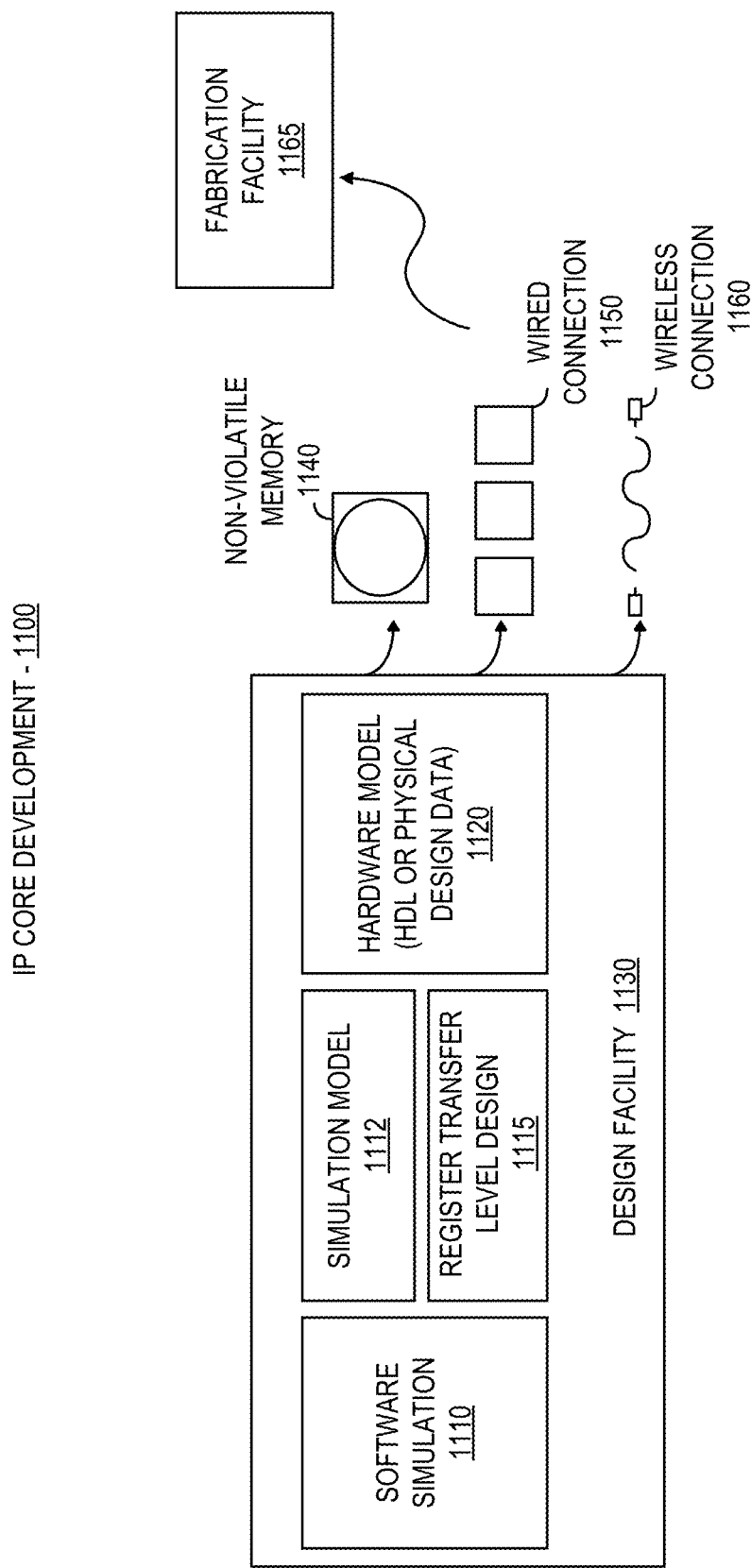
FIGS. 11A and 11B illustrate an exemplary IP core development system that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
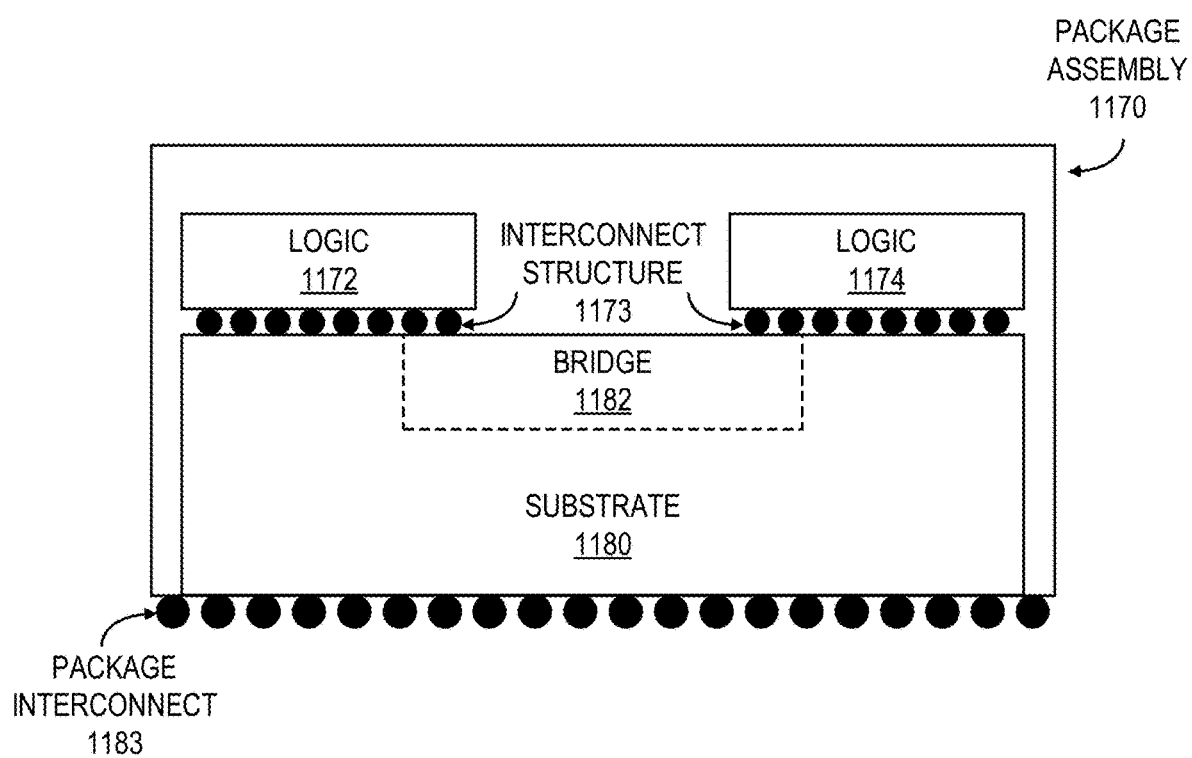

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
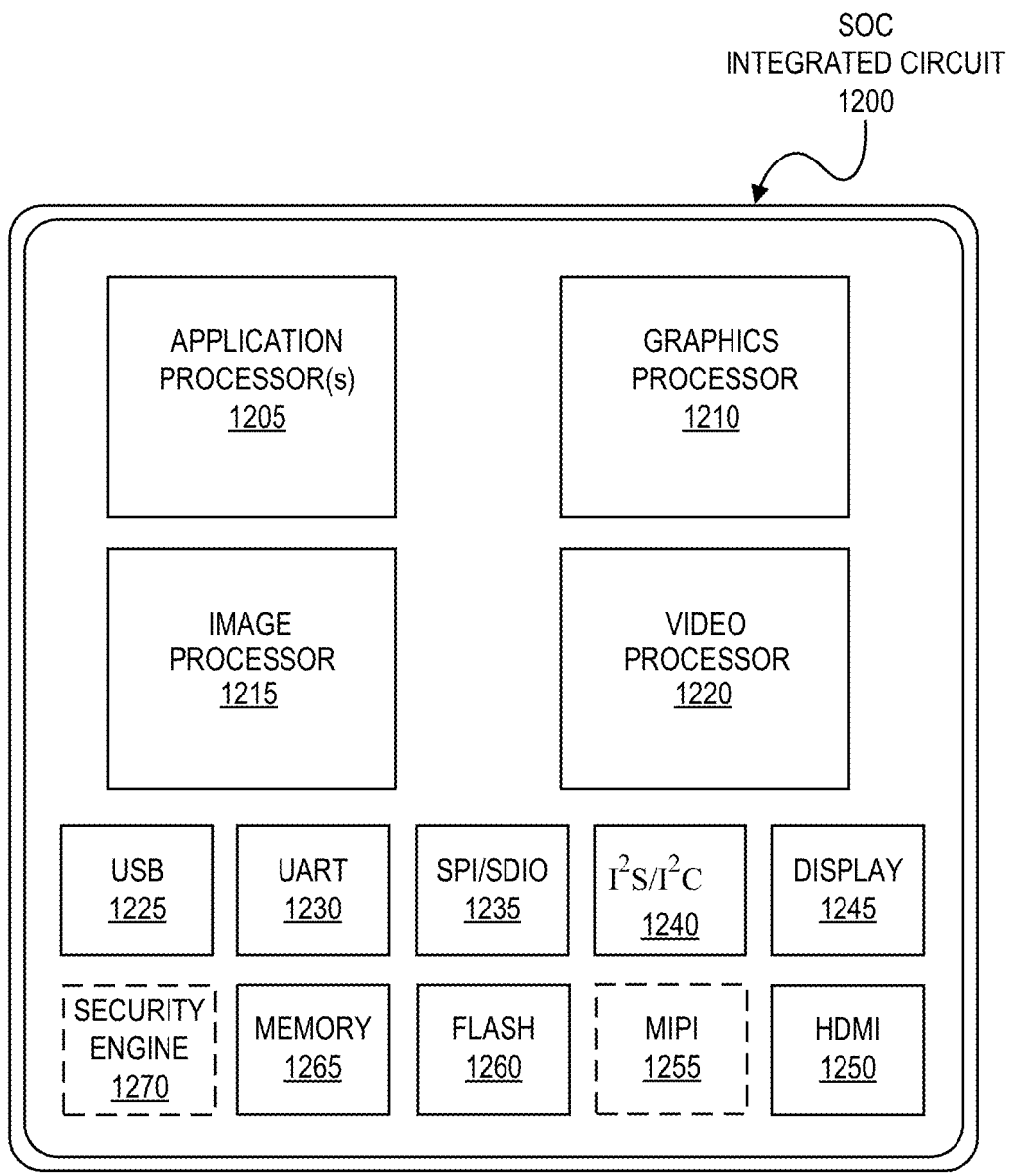
FIG. 12 illustrates an exemplary system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
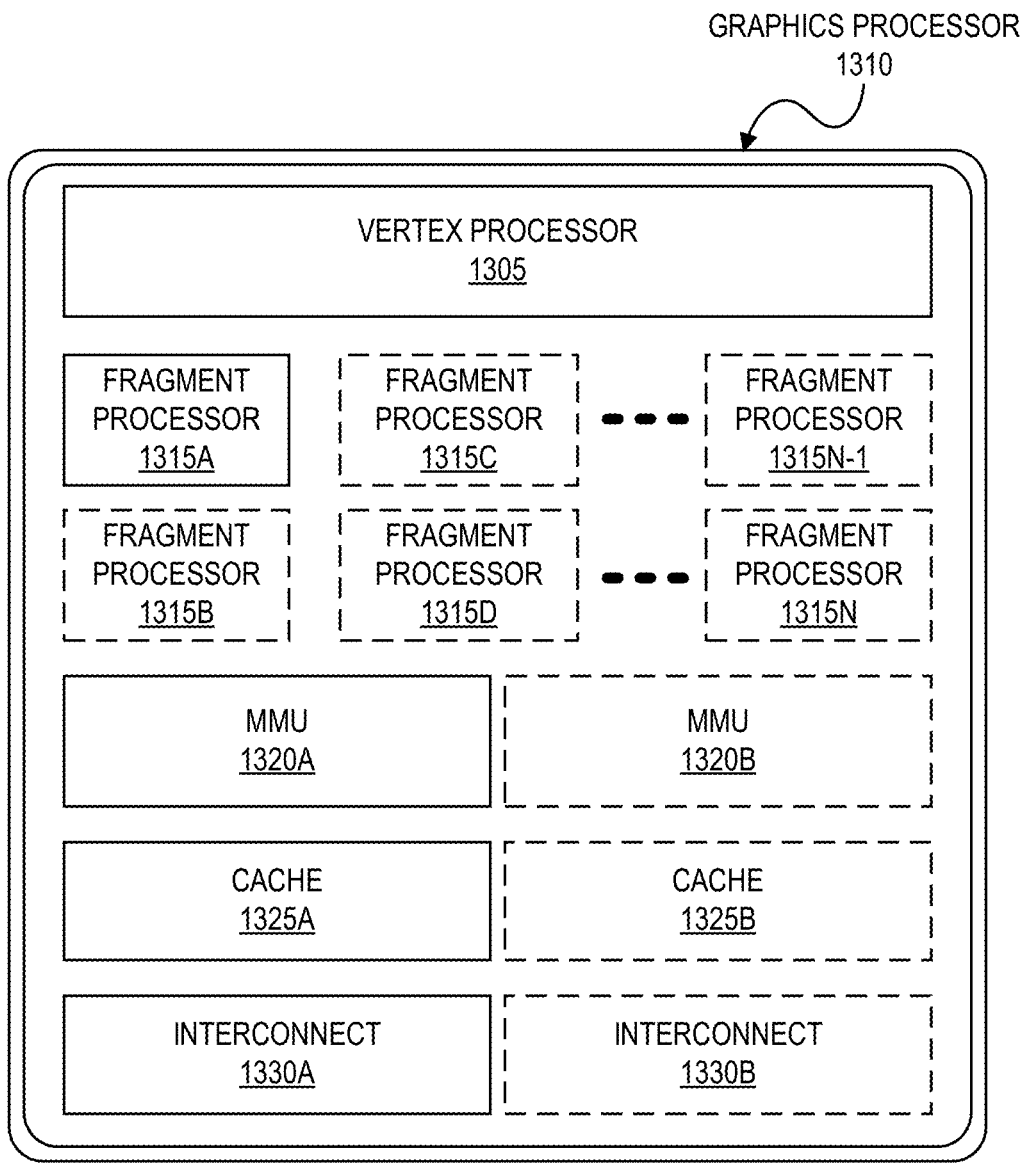
FIGS. 13A and 13B illustrate an exemplary graphics processor of a system on a chip integrated circuit that may be fabricated using one or more IP cores.
Figure 13B:
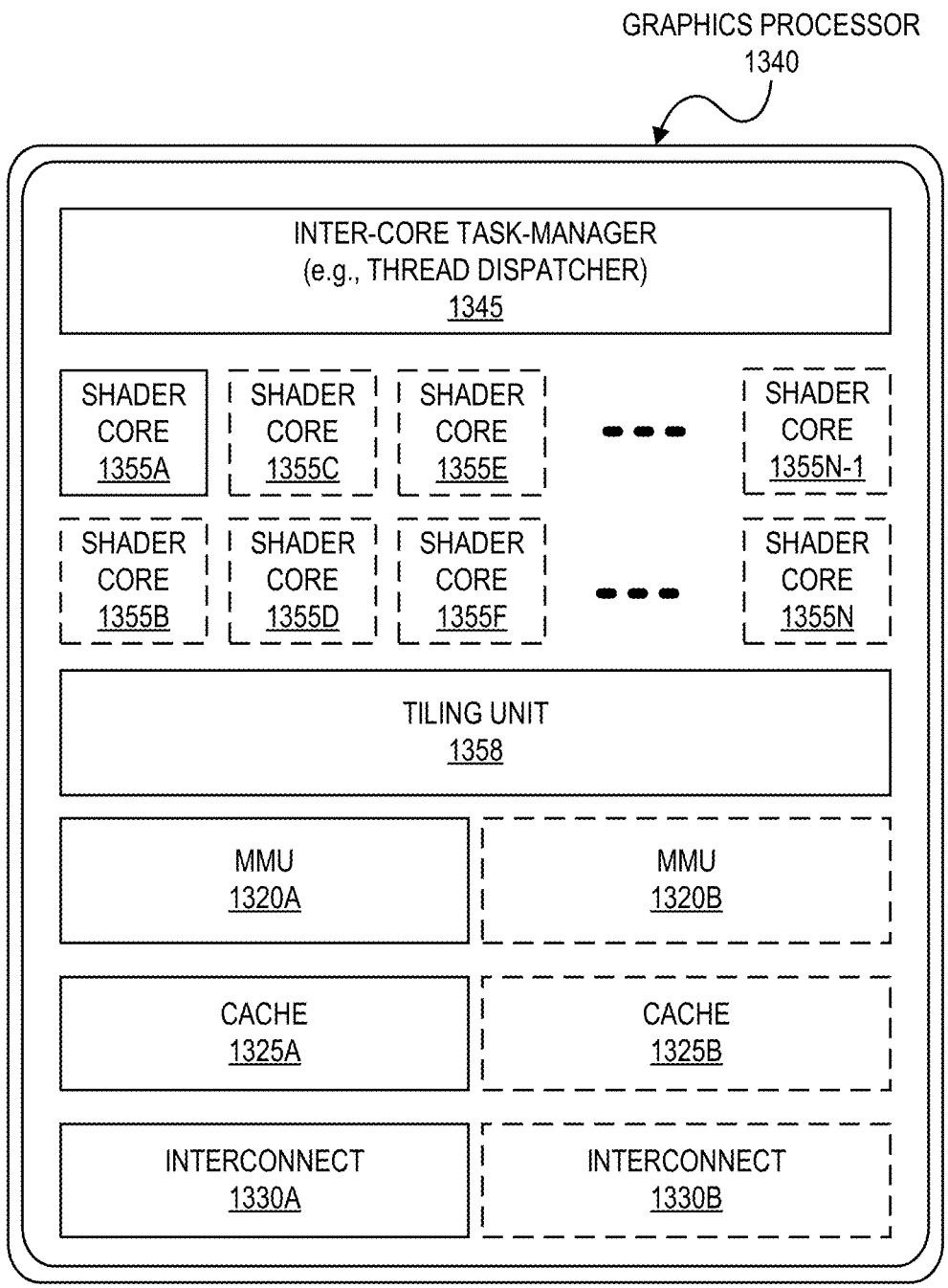

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
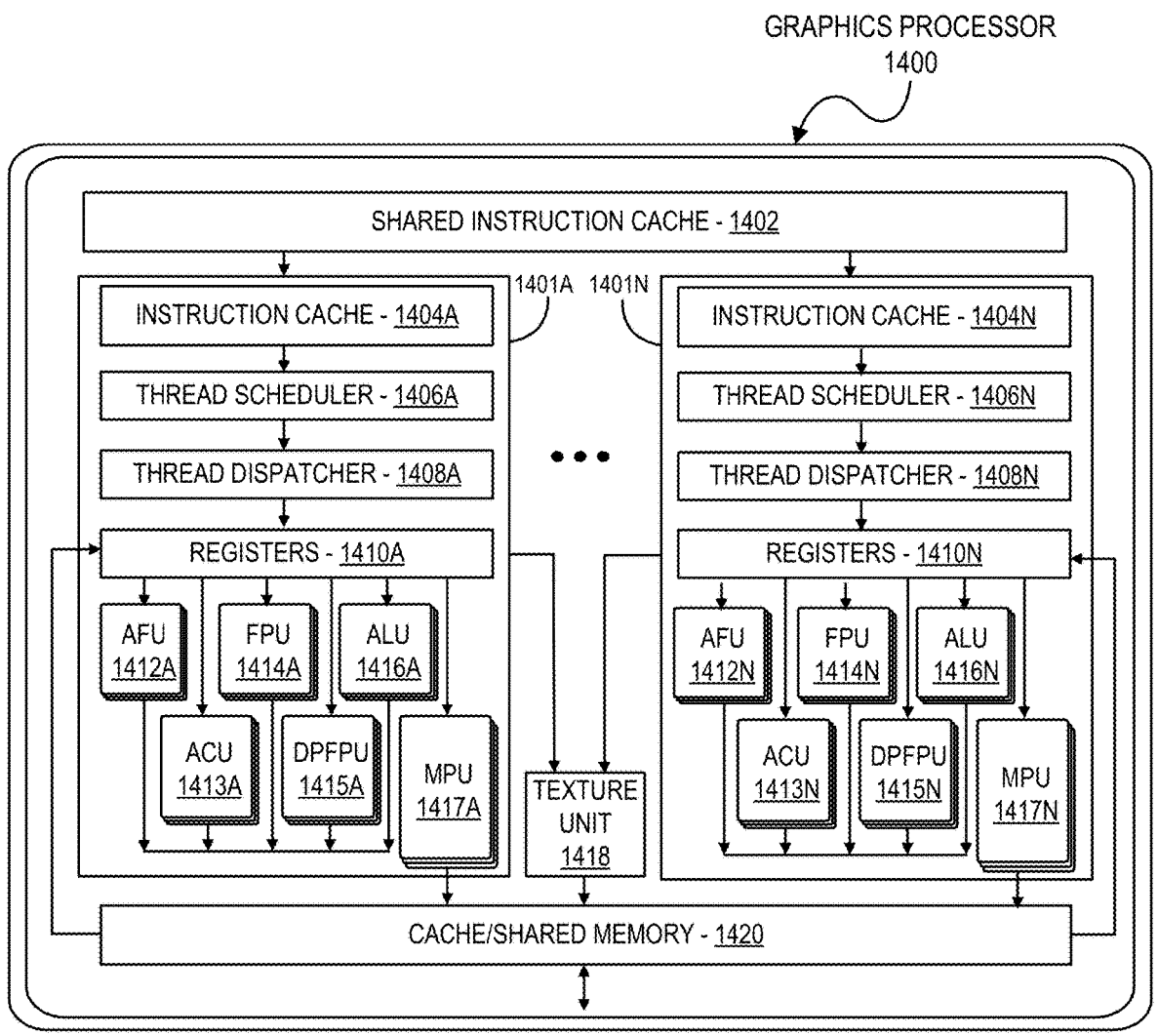
FIGS. 14A and 14B illustrate an additional exemplary graphics processor of a system on a chip integrated circuit that may be fabricated using one or more IP cores.
Figure 14B:
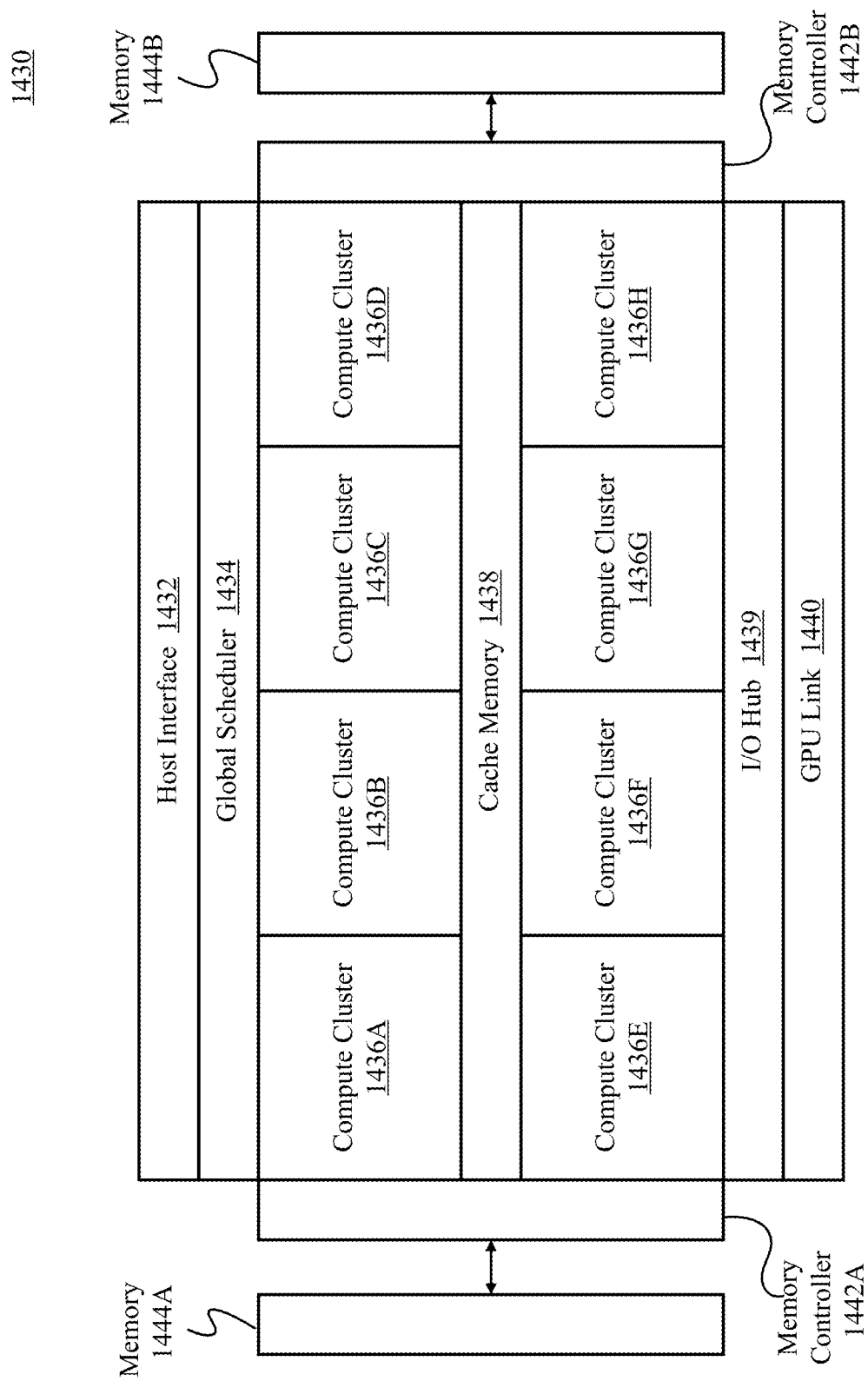

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates an additional highly-parallel general-purpose graphics processing unit 1430, which is a highly-parallel general-purpose graphics processing unit suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A-1440N. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 14434A-14434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example, and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

Examples of Parallel Subroutine Execution

Some known graphics processing units (GPUs) use wide SIMD implementations, capable of branches, loads, and stores on 128 or 256 bits at a time. For divergent control flow that arises from branching of code to forks with complex operations, a known solution for divergent control flow across SIMD lanes will execute each branch that is active for all SIMD lanes. SIMD lanes that are not executing a code path will be masked off. There are various challenges with this approach. When SIMD lanes have different control flow, the shaders will execute more instructions (the sum of all instructions taken in each branch). Also, the shader execution will be limited by the efficiency of the most complicated branch in the shader. For example, one branch may have excessive register pressure, which will lower the SIMD mode of execution for the entire shader or cause register spilling or cause less threads to be executed per WaveFront or WARP. The shader will execute inefficiently when the code path taken in each SIMD lane diverges. For example, if one SIMD lane chooses the code path A, then the shader will execute both code paths serially. If all SIMD lanes execute uniformly, the performance will be better, as only one side of the branch will be executed. Even when executed uniformly, the performance of the branch taken may still be limited by the complexity of the other branch, if register pressure in the other branch is much higher.

Branchy shaders occur where code in each branch is complex and very unique relative to the other branches. Control flow and execution of these branches is determined based of shader inputs that may diverge per SIMD lane. For example, in modern games, deferred renders will have specific code paths that execute for specific material types to illuminate each pixel in the render target. These material types are looked up via attributes in the G-Buffer.

A computer system can be improved by increasing a speed at which images are processed. Various embodiments can increase the efficiency of 3D and GPGPU workload. This results in a better end user experience in terms of usability (increased frames per second) or reduced power consumption. Various embodiments can segment an image processing routine into one or more portions, sub-segments, or subroutines. Portions, sub-segments, or subroutines can be scheduled for execution in parallel using available compute resources. For example, a Single Instruction, Multiple Data (SIMD) scheme can be used so that multiple processing elements perform the same instructions on multiple data points simultaneously. For example, a code segment with a branch to perform an operation A or operation B can be translated or changed so that execution of the code segment involves operation A and operation B being allocated for performance in parallel with other instances of operation A and operation B (respective, operations A1-An and operations B1-Bn). Operations A1-An can be scheduled to commence execution in parallel after a timer expires or reaches a threshold delay or there are enough of total instances of A-An such that all or sufficient number of paths of a parallel execution pipeline can operate. Similarly, operations B1-Bn can be scheduled to commence execution in parallel after a timer expires or there are enough of total instances of B1-Bn such that all or sufficient number of paths of a parallel execution pipeline can operate.

Various embodiments split divergent branches of a shader into separate GPU subroutine kernels. These subroutine kernels will be requested by the main shader, where each branch will be a callable shader subroutine. The subroutines will make use of a call stack to pass information such as data, state, flags, memory locations, pointers, shader handles, pre-calculated values, thread id for pixel location from the initial shader, or storage for results being returned from the shader back to the shader that invoked the subroutine kernel. The call stack can used to share information from the parent routine to the subroutine. A shader sorting unit can pack SIMD lanes for each shader subroutine requested. Once there is enough work to fully occupy all SIMD lanes, the subroutine kernel will be launched. The execution of the subroutine will be done coherently across all SIMD lanes.

Instead of branching, a shader code segment will request a new thread of execution to be scheduled to execute work specified in any or all of the branches. When execution of a branch is re-scheduled, this will also allow more work to be executed in parallel, rather than executing one branch after the next in a serial fashion.

Various embodiments can use an architecture that allows execution of code segments to make use of a call stack and a shader sorter. Instead of branching during execution of a code segment, use of a call stack and shader sorter (which takes all threads that want to run the same code patch, and repackages them to be executed so that code is coherent) can occur. When scheduling the work, relevant data will be pushed to a call stack for the thread. When the shader sorter has enough work to launch a full SIMD thread, execution of the desired function will be launched. The shader sorter can accumulate sub-segments and launch a SIMD thread that provides uniform execution of multiple instances of the same or similar sub-segment.

In various embodiments, the architecture or at least a portion of the architecture can also be used for hybrid ray traversal architecture that enables programmable shading and control of ray traversal using single instruction multiple data (SIMD) graphics processors while accelerating critical functions, such as BVH intersections, using dedicated hardware.

Within a code segment, a sub-segment (of all or a portion of the entire segment) can be identified to be allocated for execution in parallel in a variety of manners. For example, a developer can apply a syntax or tag to identify a sub-segment to be allocated for parallel execution with other instances of the same or similar sub-segments. A shader compiler of a graphics software stack can identify any sub-segment as a candidate for parallel execution with other instances of the same or similar sub-segments. In some examples, to reorganize a code segment so that its sub-segments are allocated for parallel execution, modification of or addition to the sub-segment can take place so that operational flow of the code segment is maintained. For example, unused code can be removed from a sub-segment. Removing unused code can reduce register pressure and allow for improved execution of the code modified to have unused code removed.

Various embodiments provide for identifying subroutines that can be aggregated and executed in parallel. For example, a compiler can split shader code into subroutines to attempt to reduce execution time or power usage. Various embodiments split the divergent branches of the shader into separate GPU subroutine kernels. These subroutine kernels will be requested by the main shader, where each branch will be a callable shader subroutine. The subroutines can make use of a GPU call stack. Call stacks may also store references to the continuation functions that are executed when a call returns to pass data back to the shader that invoked the subroutine kernel. Sub-routines can be called from sub-routines as much as needed.

Various embodiments provide for an API to define functions that are callable from other code in the relevant shading language. Shader creation can involve identification or specifying of a main entry point as well as other callable entry points. This collection of entry points will be referred to as a function table. At draw time, this function table can be bound to the pipeline. During execution, the shader Execution Units can send a message to the shader sorter to request a new thread of a callable function from the function table to be scheduled. When scheduling the work, relevant data will be pushed on the call stack for this thread. When the shader sorter has enough work to launch a full SIMD thread, execution of the desired function will be launched such that when work is physically executed on the Execution Units (EUs), the data on the call stack is loaded into physical register on the EU.

Example System

Various embodiments are provided of a system that can be used to schedule and execute multiple instances of a subroutine in parallel and to provide for return to any of a next instruction, main routine, or calling routine as well as share data or context with another instruction or routine. Various embodiments provide for manners of identifying and modifying an instruction set so that multiple instances of the instruction set can be executed in parallel.

Figure 15:
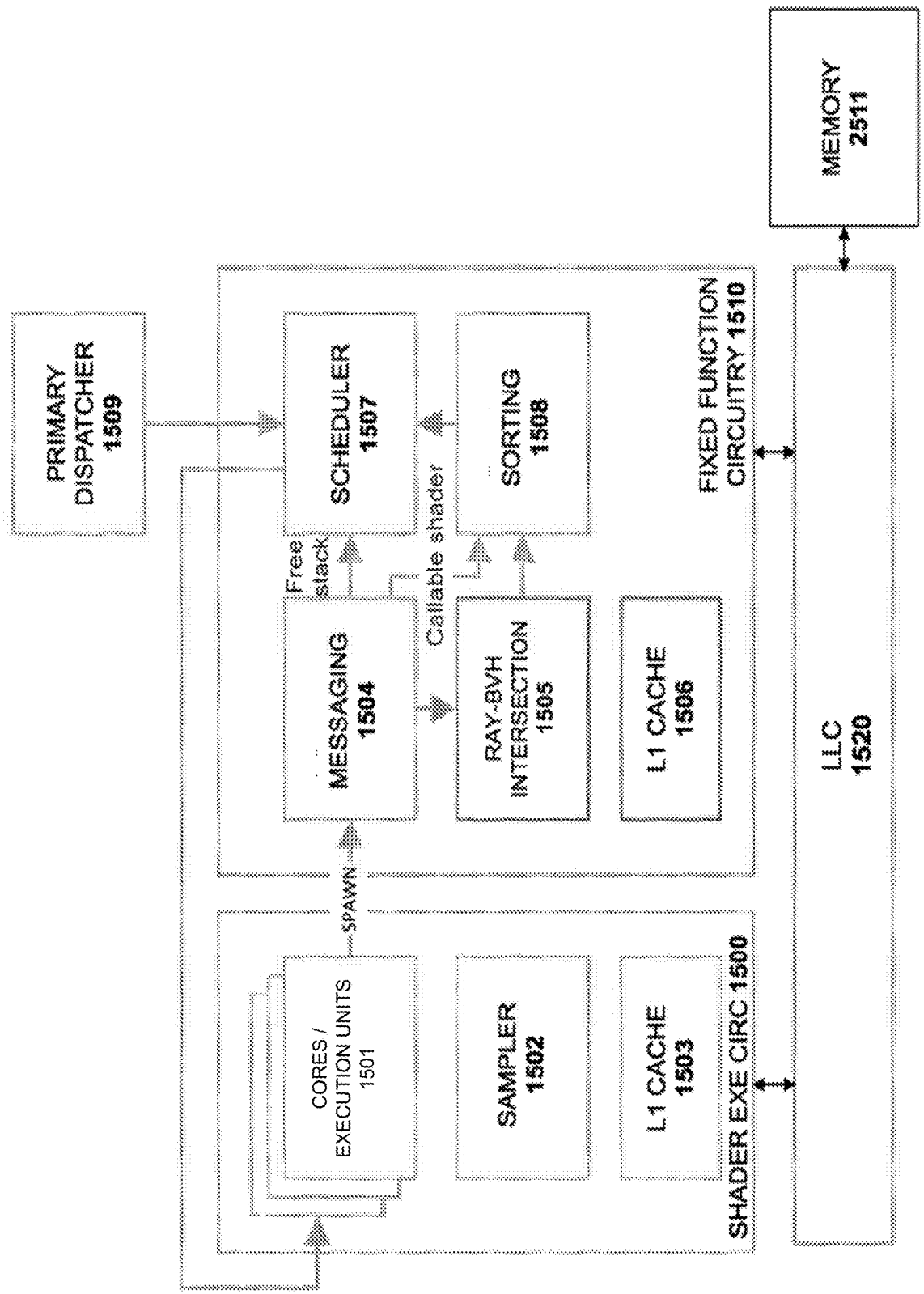
FIG. 15 illustrates one embodiment of an architecture.

FIG. 15 illustrates an embodiment of a graphics processing architecture which includes a shader execution circuitry 1500 and a fixed function circuitry 1510. The general purpose execution hardware subsystem includes a plurality of SIMD cores/execution units (EUs) 1501 (i.e., each core may comprise a plurality of execution units), one or more samplers 1502, and a Level 1 (L1) cache 1503 or other form of local memory. The fixed function hardware subsystem 1510 includes message unit 1504, a scheduler 1507, ray-BVH intersection circuitry 1505, sorting circuitry 1508, and a local L1 cache 1506.

In operation, primary dispatcher 1509 dispatches a set of primary rays to the scheduler 1507, which schedules work to shaders executed on the SIMD cores/EUs 1501. Execution of the primary shaders spawns additional work to be performed (e.g., to be executed by one or more child shaders and/or fixed function hardware). The message unit 1504 distributes work spawned by the SIMD cores/EUs 1501 to the scheduler 1507, accessing the free stack pool as needed, the sorting circuitry 1508, or the ray-BVH intersection circuitry 1505. If the additional work is sent to the scheduler 1507, it is scheduled for processing on the SIMD cores/EUs 1501. Prior to scheduling, the sorting circuitry 1508 may sort the rays into groups or bins as described herein (e.g., grouping rays with similar characteristics). The ray-BVH intersection circuitry 1505 performs intersection testing of rays using BVH volumes. For example, the ray-BVH intersection circuitry 1505 may compare ray coordinates with each level of the BVH to identify volumes which are intersected by the ray.

Shaders can be referenced using a shader record, a user-allocated structure that includes a pointer to the entry function, vendor-specific metadata, and global arguments to the shader executed by the SIMD cores/EUs 1501. Each executing instance of a shader is associated with a call stack which may be used to store arguments passed between a parent shader and child shader. Call stacks may also store references to the continuation functions that are executed when a call returns.

Figure 16:
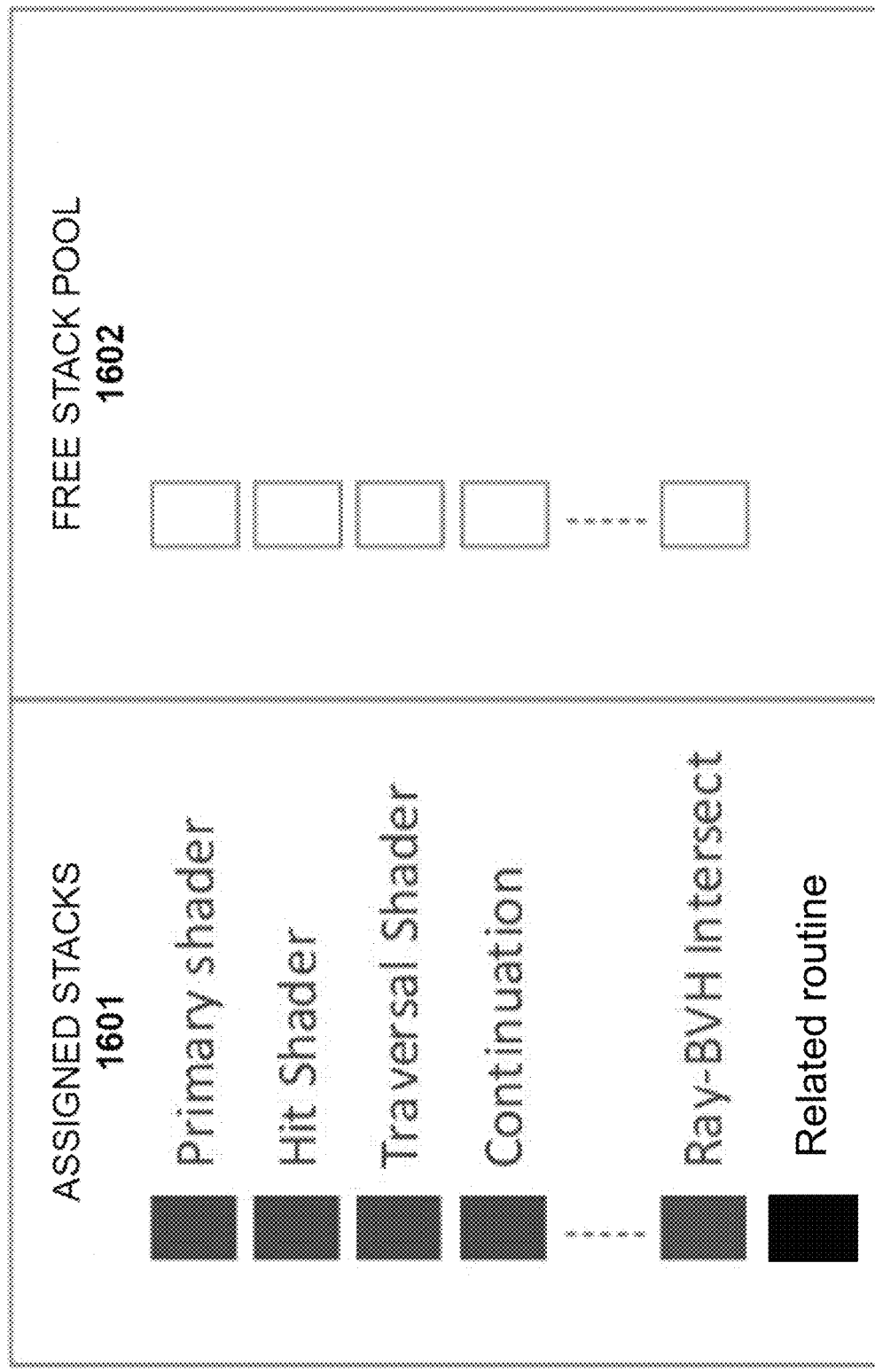
FIG. 16 illustrates example assigned stacks and a free stack pool.

FIG. 16 illustrates an example set of assigned stacks 1601 which includes a primary shader stack, a hit shader stack, a traversal shader stack, a continuation function stack, a ray-BVH intersection stack (which, as described, may be executed by fixed function hardware 1510), as well as a related routine call stack for passing states, data and references to continuation functions that are executed by a subroutine that is requested to be executed with other instances of the subroutine or when a call returns from a subroutine. New shader invocations may implement new stacks from a free stack pool 1602. Call stack can be used to re-instantiate an initial call point thread. The call stacks may be cached in a local L1 cache 1503, 1506 to reduce the latency of accesses. In some embodiments, call stacks can be stored in memory or storage.

In an embodiment, there are a finite number of call stacks, each with a fixed maximum size "Sstack" allocated in a contiguous region of memory. Therefore, the base address of a stack can be directly computed from a stack index (SID) as base address=SID*Sstack. In one embodiment, stack IDs are allocated and deallocated by the scheduler 1507 when scheduling work to the SIMD cores/EUs 1501.

Referring to FIG. 15, in one embodiment, the primary dispatcher 1509 may include a graphics processor command processor which dispatches primary shaders in response to a dispatch command from the host (e.g., a CPU). The scheduler 1507 receives these dispatch requests and launches a primary shader on a SIMD processor thread if it can allocate a stack ID for each SIMD lane. Stack IDs are allocated from the free stack pool 1602 that is initialized at the beginning of the dispatch command. In some embodiments, scheduler 1507 can be used to dispatch multiple instances of a subroutine for performance by one or more SIMD cores/EUs 1501 if a threshold number of subroutine instances are available for execution or a timer expires or reaches a threshold delay.

An executing shader can spawn a child shader by sending a spawn message to the messaging unit 1504. This message includes the stack IDs associated with the shader and also includes a pointer to the child shader record for each active SIMD lane. In an embodiment, a parent or calling shader can issue this message once for an active lane. In one embodiment, after sending spawn messages for all relevant lanes, the parent shader terminates or continues execution of other instructions.

In an embodiment, an executing shader can use messaging unit 1504 to request scheduling of execution of a subroutine that is identified for parallel execution with other instances of the subroutine.

A shader executed on the SIMD cores/EUs 1501 can also spawn fixed-function tasks such as ray-BVH intersections using a spawn message with a shader record pointer reserved for the fixed-function hardware. As mentioned, the messaging unit 1504 sends spawned ray-BVH intersection work to the fixed-function ray-BVH intersection circuitry 1505 and callable shaders directly to the sorting circuitry 1508. In one embodiment, the sorting circuitry groups the shaders by shader record pointer to derive a SIMD batch with similar characteristics. Accordingly, stack IDs from different parent shaders can be grouped by the sorting circuitry 1508 in the same batch. The sorting circuitry 1508 sends grouped batches to the scheduler 1507 which accesses the shader record from graphics memory 2511 or the last level cache (LLC) 1520 and launches the shader on a processor thread.

For example, sorting circuitry 1508 can group a threshold number of instances of the same subroutine for dispatch and execution using the same SIMD core/EU or same group of SIMD cores/EUs. A timer can be associated with an instance of a request to execute a subroutine and if the timer expires or reaches a threshold amount of delay, the subroutine can be dispatched for execution even if the threshold number of instances of the same subroutine is not met. The threshold number can be a number of lanes in a SIMD core. For example, a SIMD4 core can provide four lanes of execution so the threshold number is four in this example and four instances of a subroutine can be executed in parallel by the SIMD4 core.

In one embodiment, continuations are treated as callable shaders and may also be referenced through shader records. When a child shader is spawned and returns values to the parent shader, a pointer to the continuation shader record is pushed on the call stack 1601. When a child shader returns, the continuation shader record is popped from the call stack 1601 and a continuation shader is spawned. Spawned continuations use the sorting unit in a similar manner as callable shaders and are launched on a processor thread.

Figure 17:
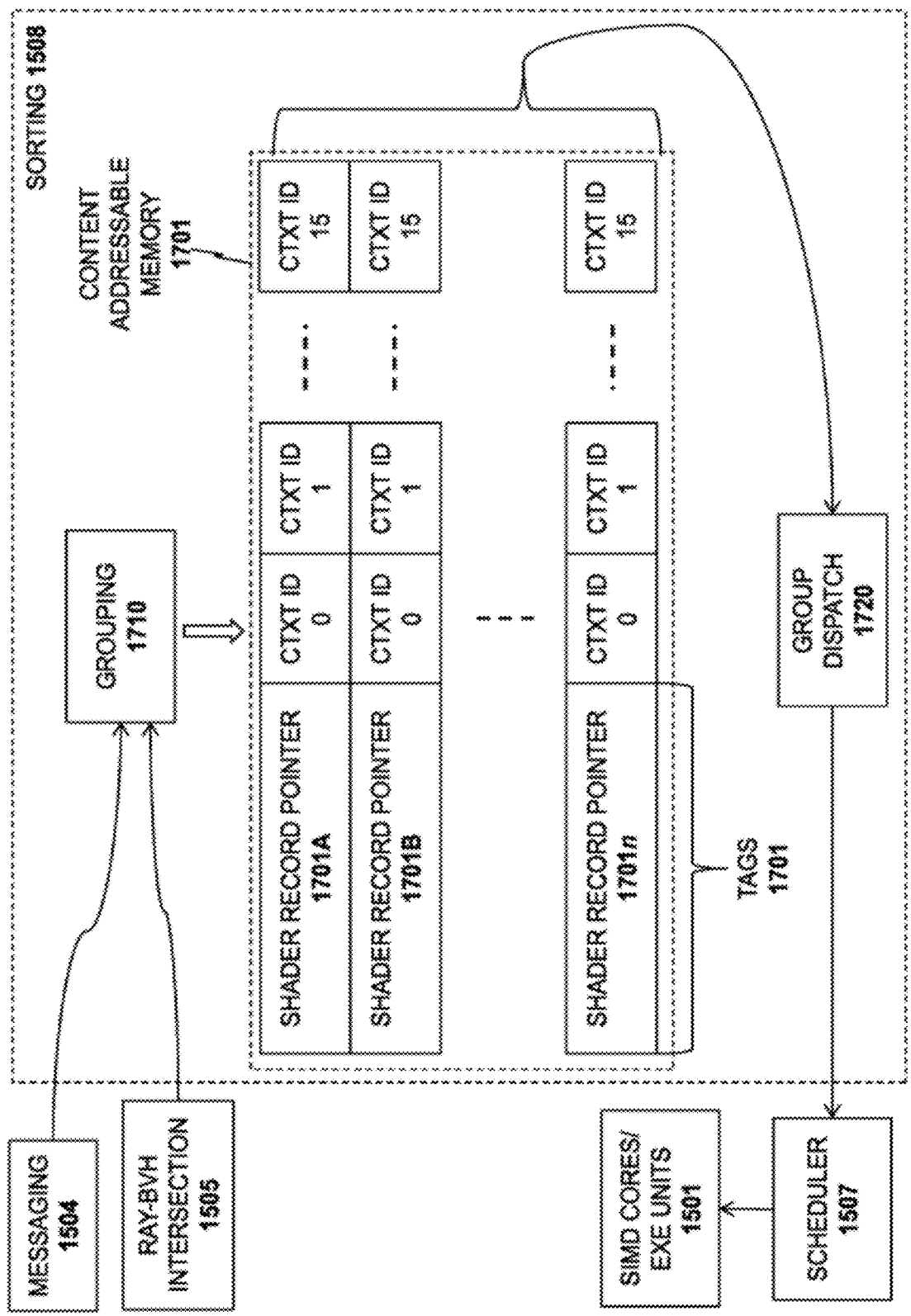
FIG. 17 illustrates sorting circuitry including a content addressable memory.

As illustrated in FIG. 17, one embodiment of the sorting circuitry 1508 groups spawned tasks by shader record pointers 1701A, 1701B, 1701n to create SIMD batches for shading. The stack IDs or context IDs in a sorted batch can be grouped from different dispatches and different input SIMD lanes. In one embodiment, grouping circuitry 1710 performs the sorting using a content addressable memory (CAM) structure 1701 comprising a plurality of entries with each entry identified with a tag 1701. As mentioned, in one embodiment, the tag 1701 is a corresponding shader record pointer 1701A, 1701B, 1701n. In one embodiment, the CAM structure 1701 stores a limited number of tags (e.g. 32, 64, 128, etcetera) each associated with an incomplete SIMD batch corresponding to a shader record pointer. For example, multiple instances of the same subroutine can be grouped for dispatch using lanes of a SIMD core.

For an incoming spawn command, each SIMD lane has a corresponding stack ID (shown as 16 context IDs 0-15 in each CAM entry) and a shader record pointer 1701A-B, . . . n (acting as a tag value). In one embodiment, the grouping circuitry 1710 compares the shader record pointer for each lane against the tags 1701 in the CAM structure 1701 to find a matching batch. If a matching batch is found, the stack ID/context ID is added to the batch. Otherwise a new entry with a new shader record pointer tag is created, possibly evicting an older entry with an incomplete batch.

An executing shader can deallocate the call stack when it is empty by sending a deallocate message to the message unit. The deallocate message is relayed to the scheduler which returns stack IDs/context IDs for active SIMD lanes to the free pool.

The sorting circuitry 1508 groups these shaders by shader record pointers 1701A-B, n to create a SIMD batch which is launched by the scheduler 1507 for SIMD execution on the graphics SIMD cores/EUs 1501. Traversal shaders can modify traversal in several ways, enabling a wide range of applications. For example, the traversal shader can select a BVH at a coarser level of detail (LOD) or transform the ray to enable rigid body transformations. The traversal shader then spawns inner traversal for the selected BVH.

Inner traversal computes ray-BVH intersections by traversing the BVH and computing ray-box and ray-triangle intersections. Inner traversal is spawned in the same manner as shaders by sending a message to the messaging circuitry 1504 which relays the corresponding spawn message to the ray-BVH intersection circuitry 1505 which computes ray-BVH intersections.

In one embodiment, the stack for inner traversal is stored locally in the fixed-function circuitry 1510 (e.g., within the L1 cache 1506). When a ray intersects a leaf node corresponding to a traversal shader or an intersection shader, inner traversal is terminated and the inner stack is truncated. The truncated stack along with a pointer to the ray and BVH is written to memory at a location specified by the calling shader and then the corresponding traversal shader or intersection shader is spawned. If the ray intersects any triangles during inner traversal, the corresponding hit information is provided as input arguments to these shaders as shown in the below code. These spawned shaders are grouped by the sorting circuitry 1508 to create SIMD batches for execution.

Example of Workload Handling

Figure 18:
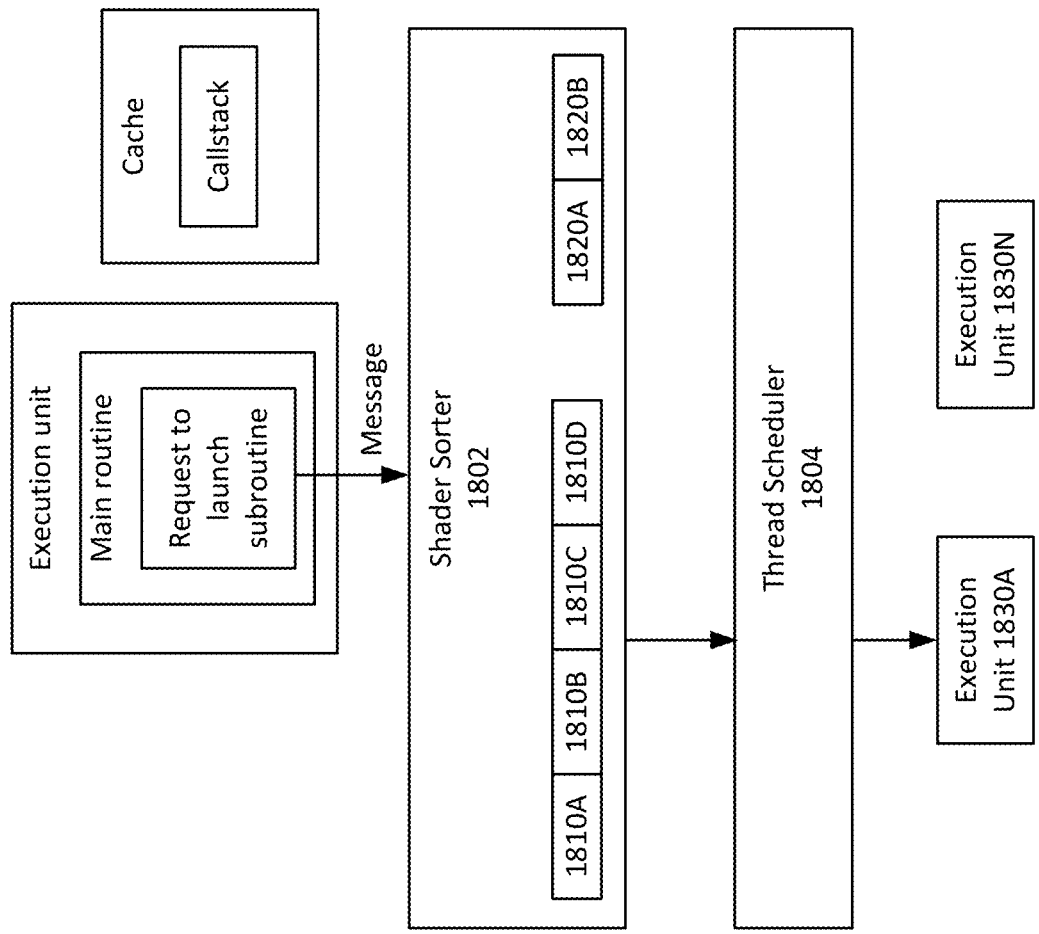
FIG. 18 provides an example of execution of multiple instances of a subroutine.

FIG. 18 provides an example of execution of multiple instances of a subroutine. An execution unit executes a main routine and an instruction, API, or syntax marker at the beginning of the subroutine causes the subroutine to be sent for execution with other instances of the same subroutine by a message to shader sorter 1802 to launch the subroutine. A call stack is used to share data, pointers or other information, from the main routine for use by the subroutine when executed by a SIMD core or after the subroutine ends, share data generated by the subroutine with the main routine. At the time shown, shader sorter 1802 has received requests from other routines to launch subroutines 1810A-1810D and 1820A-B. Subroutines 1810A-1810D are multiple instances of the same or similar instructions. In this example, SIMD4 execution is available and shader sorter 1802 requests thread scheduler 1804 to execute subroutines 1810A-1810D using a SIMD4 core. However, in this example, there are only two instances of subroutine 1820, namely, subroutines 1820A and B. Insufficient number of instances of subroutine 1820 are available and shader sorter 1802 does not request thread scheduler 1804 to execute subroutines 1820A and B until either four instances of subroutine 1820 are received or a timer reaches a threshold time of delay or expires. For example, if a request to execute subroutine 1820A was received before a request to execute subroutine 1820B, the timer can commence counting from receipt of the request by shader sorter 1802 to execute subroutine 1820A. For example, the timer can commence counting from when the main routine requests shader sorter to launch the subroutine. A threshold amount of delay can be set as an acceptable latency before a thread should be dispatched to thread scheduler 1804. In some cases, a timer starts at a threshold amount of delay and counts down to zero before shader sorter 1802 requests thread scheduler 1804 to execute any available instance of a subroutine. Execution unit 1830A can perform subroutines 1810A-1810D in parallel.

In some embodiments, the GPU can swap lanes between various instances of SIMD executions, such that all SIMD lanes can execute the same code, main routine, or subroutine. Each hardware thread within an EU has a dedicated large-capacity high-bandwidth register file (GRF) and associated independent thread-state. In order to do this, the GPU thread controller swap data of general register file (GRF) space for the SIMD lanes being swapped, or the lane swap would use an address/data look up re-mapping to look up the initial data in each SIMD lane's GRF.

Figure 19:
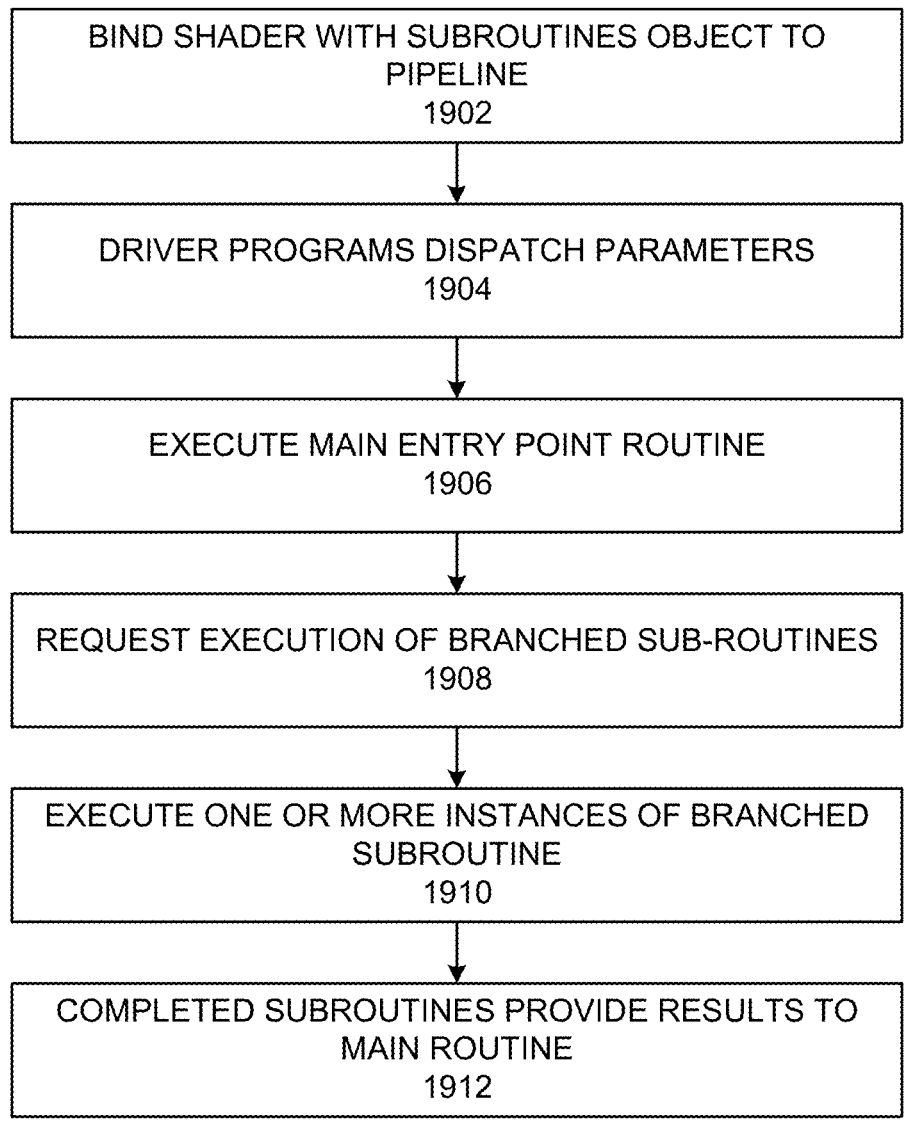
FIG. 19 provides an example process that can be used to execute multiple instances of a subroutine in parallel.

FIG. 19 provides an example process that can be used to execute multiple instances of a subroutine in parallel. At 1902, a shader with one or more subroutines is bound or associated with execution of a graphics pipeline. For example, a driver used to invoke a graphics pipeline can initiate or perform 1902. At 1904, operating parameters (e.g., data or state information) associated with the shader and subroutines are made available to the graphics pipeline. The driver can also initiate or perform the dispatch. At 1906, the main entry point routine of the shader can be executed. For example, an execution unit (EU) can be used to execute the main routine. At 1908, a branch at the main routine is reached and subroutines that spawn from the branch are requested to be scheduled for execution. For example, 1908 can include an execution unit that executes the main routine transmitting a message to the shader sorter to schedule execution of branch subroutines. The main routine can cease to execute by the EU or the main routine can be halted until results from the branched subroutine are available. At 1910, one or more instances of a branched subroutine are executed. For example, shader sorter can accumulate multiple instances of a branched subroutine and when a threshold number of instances is reached, the shader sorter can request the thread scheduler to invoke an execution unit to execute the threshold number of branched subroutines in parallel. For example, a SIMD-128 can be used to execute 128 instances of the branched subroutine. Shader sorter can invoke execution of one or more instances of a branched subroutine when time limit expires for execution of any subroutine, even if the threshold number is not reached. At 1912, completed subroutines provide results. For example, a completed subroutine sends message to thread scheduler indicating that the subroutine has completed, and results are available in a call stack and the results are available for use by another thread. Thread scheduler can create and reinstate or continue execution of the main routine to execute its next instruction using the call stack. If the main routine has no other instructions after the branch, the main routine can end, and its associated parameters and data provided for use by the graphics pipeline or stored. The child shader can end the entire thread if there is no other code left to execute in the main shader. In this case, the main shader is not called again, and the final results will be written out and the call stack memory will be freed. If the main routine continues after the branch, the call stack can be used to pass data and relevant information to the main routine from the subroutine. The call stack may also store references to the continuation functions that are executed when a call returns.

Example of Identification of Separately Executable Subroutines

Reference to example shader code below, Shader Code Example 1, is used to illustrate an example embodiment. This simplified code example shows a deferred tiled illumination shader which is designed to support multiple material types. Each material type will have its own custom illumination code. For example, a buffer or image (with associated one or more pixels) identified as extra-terrestrial or "alien" material can be illuminated with by use of subroutine "IlluminateAlienWithLight" but a buffer or image that is not identified as extra-terrestrial or "alien" material can be processed using subroutine "IlluminateGBufferPhysically-Based."

The shader may execute inefficiently when a SIMD core executes a routine in one lane but a different routine in a different lane. For example, if one SIMD lane chooses or executes the "IlluminateAlienWithLight" code path, then the shader will execute both code paths serially ("IlluminateGBufferPhysicallyBased" after "IlluminateAlienWithLight"). If all SIMD lanes execute the same routine, the performance will be better, as only one side of the branch will be executed. Even when executed uniformly, the performance of the branch taken may still be limited by the complexity of the other branch, if register pressure in the other branch is much higher that leads to an increase in number of registers or spill into memory.

Shader Code Example 1

```
Main Routine
  [numthreads(16, 16, 1)]
  void Complex_IlluminateCS(uint3 threadID:SV_DispatchThreadID)
  {
    float3 resultColor=0.0;
    GBuffer gBuffer=LoadGBuffer(threadID);
    int TileIndex=CalculateTileIndex(threadID);
    int NumLights=LoadNumCulledLights(TileIndex);
    if (gBuffer.IsAlienMaterial)
    {
      IlluminateAlienWithLight(TileIndex, NumLights, threadID.xy, lightData, gBuffer);
    }
    else
    {
      IlluminateGBufferPhysicallyBased(TileIndex, NumLights, threadID.xy, lightData, gBuffer);
    }
  }
Subroutine IlluminateAlienWithLight
  void IlluminateAlienWithLight(int TileIndex, int NumLights, int2 screenPosition, GBuffer gBuffer)
  {
    float3 illumination=0;
    for (int i=0; i<NumLights; ++i)
    {
      int LightIndex=LoadLightIndex(TileIndex, i);
      LightData lightData=Load LightData(LightIndex);
      //Specialized illumination function which is completely different than IlluminateAlienWithDeathLaser.
      //This function also executes hundreds of instructions.
      illumination+=AlienMaterialLighting(gBuffer, lightData);
    }
    IlluminationOutput[screenPosition.xy]=illumination;
  }
Subroutine IlluminateGBufferPhysicallyBased
  float3 IlluminateGBufferPhysicallyBased(int TileIndex, int NumLights, int2 screen Position, GBuffer gBuffer)
  {
    float3 illumination=0;
    for (int i=0; i<NumLights; ++i)
    {
      int LightIndex=LoadLightIndex(TileIndex, i);
      LightData lightData=Load LightData(LightIndex);
      //Default illumination code path that handles all light types. This function also executes a hundred instructions.
      illumination+=PhysicallyBasedLighting(gBuffer, lightData);
    }
    IlluminationOutput[screenPosition.xy]=illumination;
  }
```

Instruction semantics can define a callable entry point from a thread as well as invocation of the entry point. The sample code of Shader Code Example 1 can be modified so that a subroutine preceded by [_entrypoint] can mark the subroutine as an additional entry point which is callable from another thread. Inside the main entry point/routine "Complex_IlluminateCS", the callable subroutines are accessed by use of the "Call" syntax to schedule the selected subroutine for execution with other of the same subroutines called by other routines or the same main routine. Each executing instance of a shader is associated with a call stack which may be used to store arguments, data, or states passed between a parent shader and child shader. Any instruction semantic other than "[_entrypoint]" can be used to mark a subroutine as one that can be executed with other instances of the same subroutine.

Shader Code Example 2

```
[_entrypoint]
void IlluminateAlienWithLight(int TileIndex, int NumLights, int3 originalThreadID, GBuffer gBuffer)
{
  float3 illumination=0;
  . . .
  IlluminationOutput[originalThreadID.xy]=illumination;
}
[_entrypoint]
float3 IlluminateGBufferPhysicallyBased(int TileIndex, int NumLights, int3 originalThreadID, GBuffer gBuffer)
{
  float3 illumination=0;
  . . .
  IlluminationOutput[originalThreadID.xy]=illumination;
}
[numthreads(16, 16, 1)]
void Complex_IlluminateCS(uint3 threadID: SV_DispatchThreadID)
{
  float3 resultColor=0.0;
  GBuffer gBuffer=LoadGBuffer(threadID);
  int TileIndex=CalculateTileIndex(threadID);
  int NumLights=LoadNumCulledLights(TileIndex);
  if (gBuffer.IsAlienMaterial)
  {
    Call(IlluminateAlienWithLight(TileIndex, NumLights, threadID, lightData, gBuffer));
  }
  else
  {
    Call(IlluminateGBufferPhysicallyBased(TileIndex, NumLights, threadID, lightData, gBuffer));
  }
}
```

Example of Function Table Creation and Binding to a Pipeline

When compiling the main entry point "Complex_IlluminateCS", the compiler will compile the main shader routine along with each referenced function tagged with [_entrypoint]. Each entry point is added to a function table that is bound to a shader. When programming on the application side, the creation of a shader function table will be similar to that of compiling a shader. For example, a code sample in DirectX parlance below provides function table creation for main routine Complex_IlluminateCS.

The function table can be stored in memory. A pointer to any entry point or function in the function table can be provided by the compiler to the shader sorter. A main routine or subroutine referenced by the function table can be a kernel stored in memory. The function table can reference a symbol table that has addresses of kernels of any subroutines stored in memory. Kernels can be accessed from the specified addresses for execution.

Shader Code Example 3

```
void                IlluminationShader::Initialize(const
    char*pShaderName,              Device*pDevice,
    ShaderCompiler*pCompiler)
{
    pCompiler->CompilerFunctionTable(
        pShaderName,
        "Complex_IlluminateCS",
        pDevice,
        &m_ShaderFunctionTable);
}
```

In response to draw commands or at image draw time, the interface will bind the function table to a graphics pipeline for execution. For example, a code sample to bind a function table to perform work is provided below as Shader Code Example 4.

Shader Code Example 4

```
void                IlluminationShader::Render
    (DeviceContext*pDeviceContext)
{
    pDeviceContext->SetCSFunctionTable(m_Shader-
        FunctionTable);
    pDeviceContext->SetShaderResourceViews( );
    pDeviceContext->SetConstants( );
    pDeviceContext->SetUnorderedAccessViews( );
    pDeviceContext->Dispatch(m_ThreadGroupCountX,
        m_ThreadGroupCountY, 1);
}
```

Example Compiler Designation of Subroutines for Parallel Execution

Figure 20:
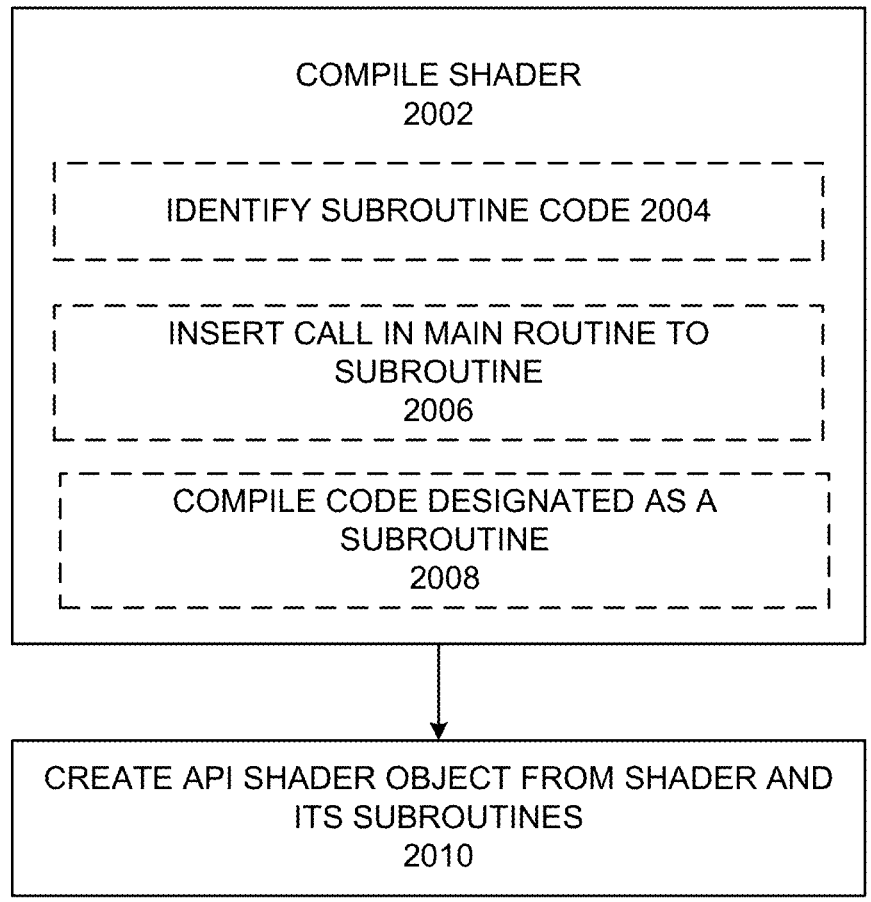
FIG. 20 provides an example process that a shader compiler can perform to create one or more callable shader objects.

FIG. 20 provides an example process that a shader compiler can perform to create one or more callable shader objects. At 2002, compiling of a main shader routine commences. The main shader routine can include one or more branch routines that can be identified and executed in parallel with other instances. At 2004, code in a shader subroutine is identified as executable with other instances of the subroutine. For example, a shader routine can be identified in 2004 can be a code branch executed in response to satisfying a condition of divergence. A branch can be divergent from another branch, where code in the branch has a sufficient number of instructions, there is a sufficient divergence in instructions from instructions of another branch (e.g., the branches do not include substantially the same code), or a sufficient difference in compiler-determined register allocation of each branch (e.g., number of registers allocated per branch). For example, a shader routine identified in 2004 can be a code branch executed in response to satisfying a condition where control flow and execution of the code branch is determined based of shader inputs that may diverge per SIMD lane. For example, in games, deferred renders will have specific code paths that execute for specific material types to calculate lighting (illumination) of each pixel in the render target.

Such code branches can be identified in 2004. In 2006, a call operation to the subroutines identified in 2004 is inserted into the main routine. At 2008, the main routine and subroutine(s) are compiled as a separate code. At 2010, an API shader object is created for the shader routine and its subroutines. For example, in connection with applying lighting to an object and displaying the object, an API shader object can be used that binds a function table to a graphics pipeline, where the function table identifies a main shader routine and entry to all of its subroutines.

Example Code Modifications of Main Routine and Subroutines

Figure 21:
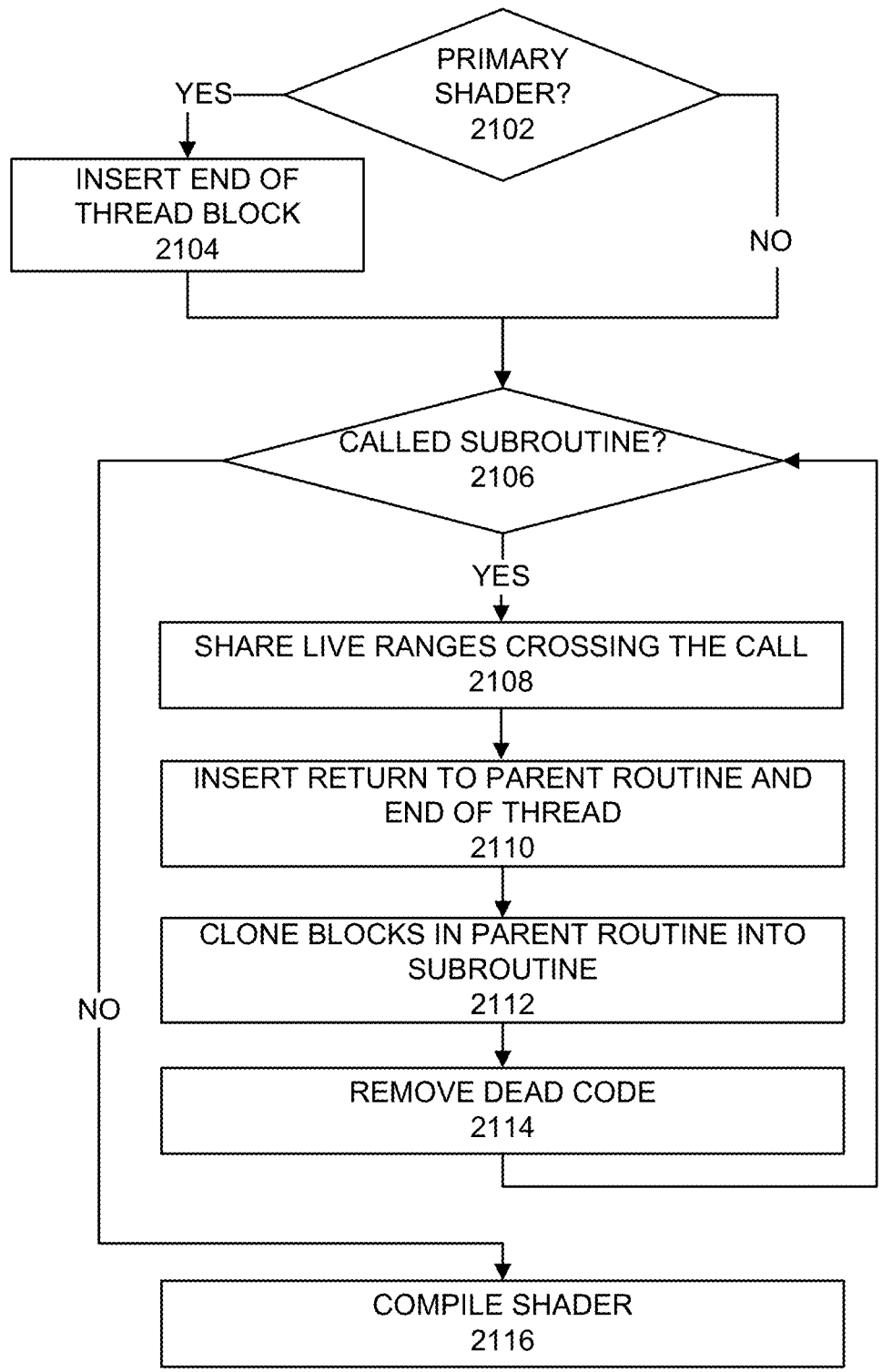
FIG. 21 depicts an example process that can be used to modify primary shader code into multiple portions.

After the compiler, application, or developer decides where to insert a divergent call to a branched subroutine, the rest of the shader depending on values from the divergent call can be modified to ensure execution of the rest of the shader. For a return value from the divergent call or for several divergent calls to be serialized for execution, the compiler, application, or developer break ups the shader into several pieces. For example, FIG. 21 depicts an example process that can be used by a compiler, application, or developer to modify primary shader code into multiple portions that can be independently executed or executed serially while also maintaining data and information flow and intended execution flow of the primary shader. At 2102, a determination is made as to whether the primary shader is being examined for potential code modifications. If the primary shader is being examined, then at 2104, an end of thread block is added to the primary shader after a subroutine that was called returns back to the primary shader. If the primary shader is not being examined, then 2106 follows.

At 2106, a determination is made as to whether a called subroutine is being examined for potential modification. For an examined subroutine, at 2108, an instruction to share data between parent and subroutine is added to the subroutine code. Live ranges crossing the divergent call to the subroutine can be shared between parent and called routines using a call stack, for example. For example, a call stack can be used to share information such as data, state, flags, memory locations, pointers, or a shader handle. At 2110, a return instruction is inserted in the subroutine to return to the parent routine. A return instruction can be an instruction to return to an instruction in the parent routine that follows the subroutine. At 2112, instruction blocks executed from the main routine that are also referenced by the subroutine are added to the subroutine. When a subroutine is modified to be independent from a main routine, certain code blocks that are relied upon by the subroutine are added to the subroutine so that the subroutine can execute independently but in accordance with its instruction flow prior to separation. At 2114, dead code is removed from the subroutine by removing code from the subroutine that is not used. A scene graph can be used to identify dead code, code that is not used. At 2116, the main shader routine and any related subroutine are compiled and available for execution.

FIG. 22 depicts an example of manner of transforming a primary shader into three callable shaders for a shader represented by Shader Code Example 4 below.

Shader Code Example 4

```
BlockA
...
if( ... ){
   BlockC
   DivergentCall( )
   BlockC'
} else {
   BlockB
   if( ... ){
      BlockD
   } else {
      BlockE
      Dispatch( )
      BlockE'
   }
}
```

With respect to Shader Code Example 4, FIG. 22 shows thread 2200 having blockA shown as A, blockB shown as B, and so forth up to Block E'. Thread 2200 has a blockA that branches to BlockB or [blockC, DispatchC( ), blockC']. BlockB branches to BlockD or [blockE, DispatchE( ), blockE']. DispatchC( ) can call a subroutine that is identified as separately executable to a shader sorter for potential parallel execution with other instances of the subroutine. Similarly, DispatchE ( ) can call a subroutine that is identified as separately executable to a shader sorter. In this example, paths blockB and blockC are divergent paths from blockA. Execution of blockB or blockC can be triggered by satisfaction of a developer-specified condition. BlockD and blockE are divergent paths from blockB. All of blocks D, E' and C' converge to BlockF. An EOT represents an end of thread 2200.

A compiler, application, or developer can transform thread 2200 into threads 2210, 2220, and 2230. For example, the process of FIG. 21 can be used to transform thread 2200 into threads 2210, 2220, and 2230. Threads 2210, 2220, and 2230 can execute independently and in the same or different SIMD cores. Code blocks of thread 2200 can be copied into thread 2220 and 2230 to allow independent execution of thread 2220 and 2230 from thread 2210. Execution of any of thread 2210, thread 2220, or thread 2230 can leverage execution of multiple instances a thread in lanes of a SIMD core.

Thread 2210 is a modified version of thread 2200 such that blockE' and blockC' are removed (but moved to respective threads 2220 and 2230). In addition, EOT is added at the end of thread 2210 and RetireID is added between blockF and the EOT block. Execution of DispatchE( ) can cause a request to execute an instance of the subroutine called by DispatchE( ). Similarly, execution of DispatchC( ) can cause a request to execute an instance of the subroutine called by DispatchC( ). However, after completed execution of a subroutine (not shown) called by DispatchE( ) or a subroutine (not shown) called by DispatchC( ), there is a return to thread 2210 and specifically the EOT block.

Thread 2220 can be called after completion of a subroutine called by DispatchE( ), Continuation thread 2220 includes blockE' (from thread 2200), blockF (from thread 2200), RetireID, and end of thread (EOT). RetireID can make available a call stack in cache or memory associated with execution of thread 2220 on one or more SIMD lanes to another thread, such as thread 2210. For example, results and other information from thread 2220 may be made available or stored by execution of RetireID. After completion of thread 2220, there is return to thread 2210, which executes an EOT.

Continuation thread 2230 can be called after completion of a subroutine called by DispatchC( ). Continuation thread 2230 includes blockC' (from thread 2200), blockF (from thread 2200), RetireID, and EOT. Results and other information from thread 2230 may be made available or stored by RetireID for use by another thread such as thread 2210. After completion of thread 2230, there is return to thread 2210, which executes an EOT.

Figure 23:
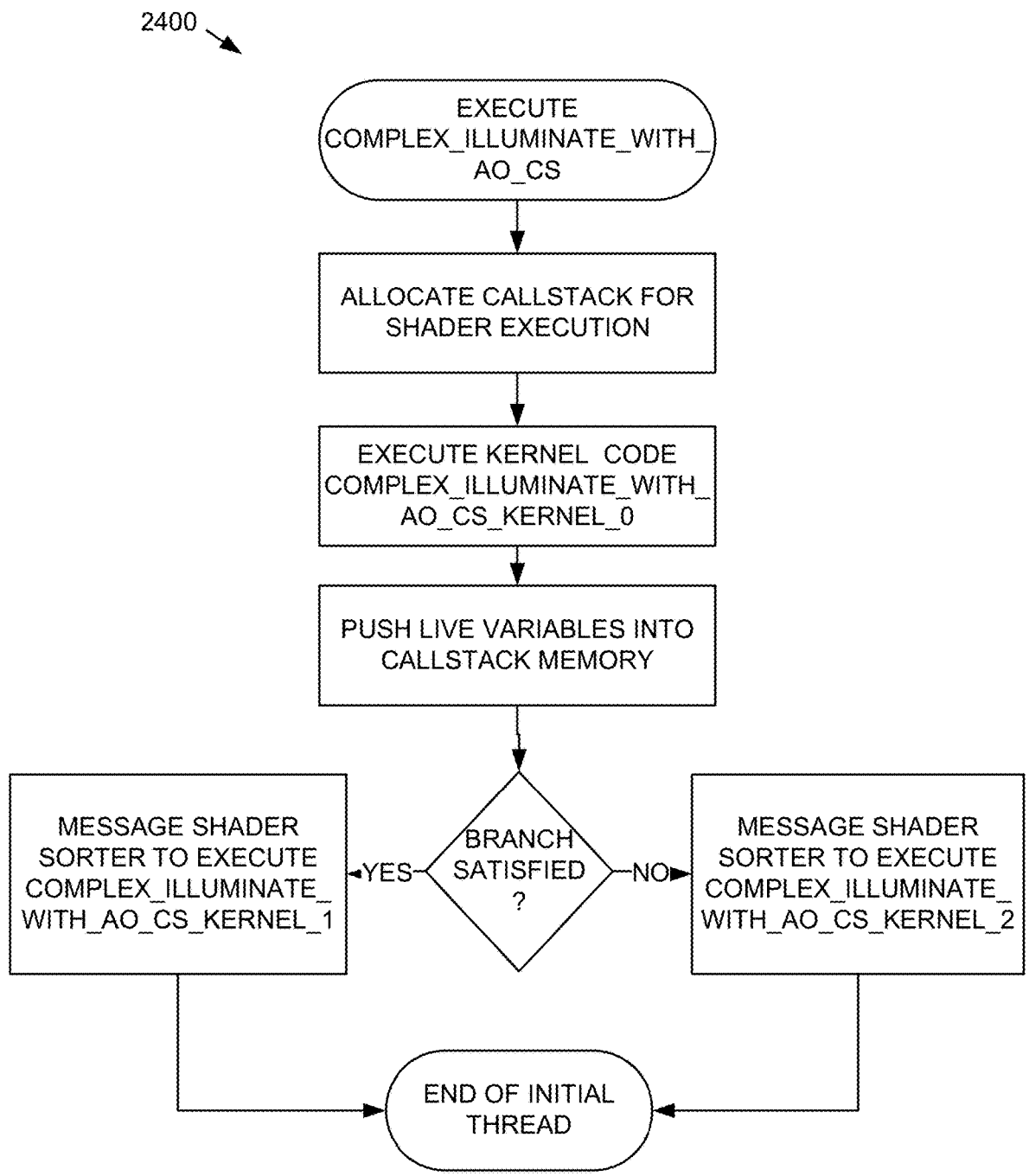
FIGS. 23-25 provides an example process that can be used to execute a main thread with calls to other subroutines.
Figure 24:
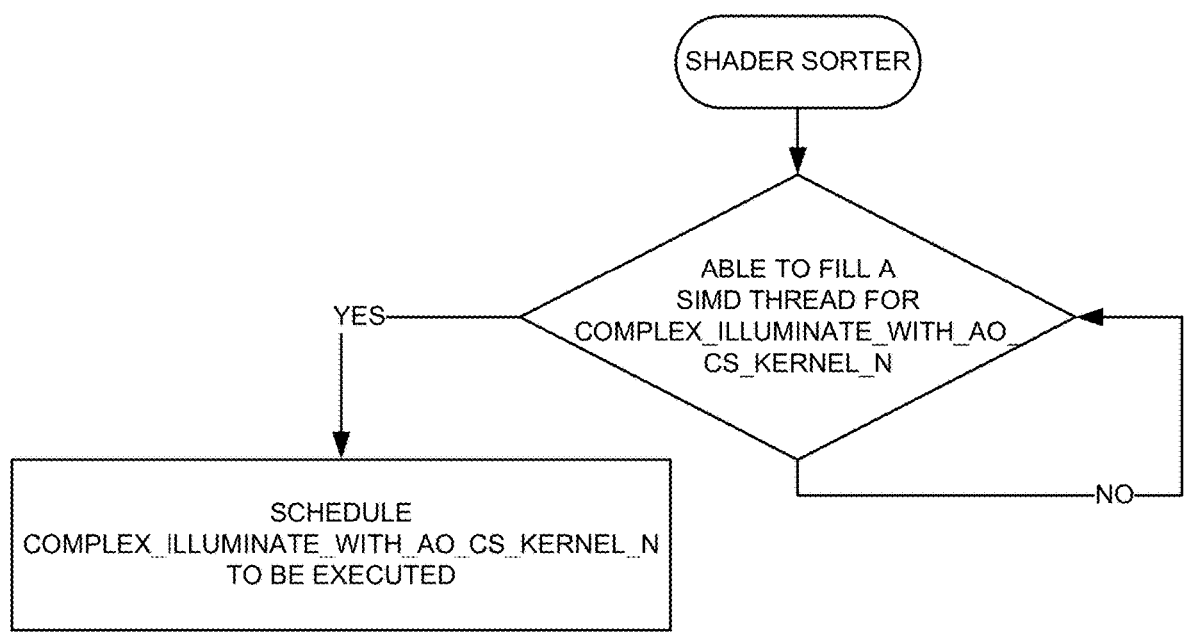
Figure 25:
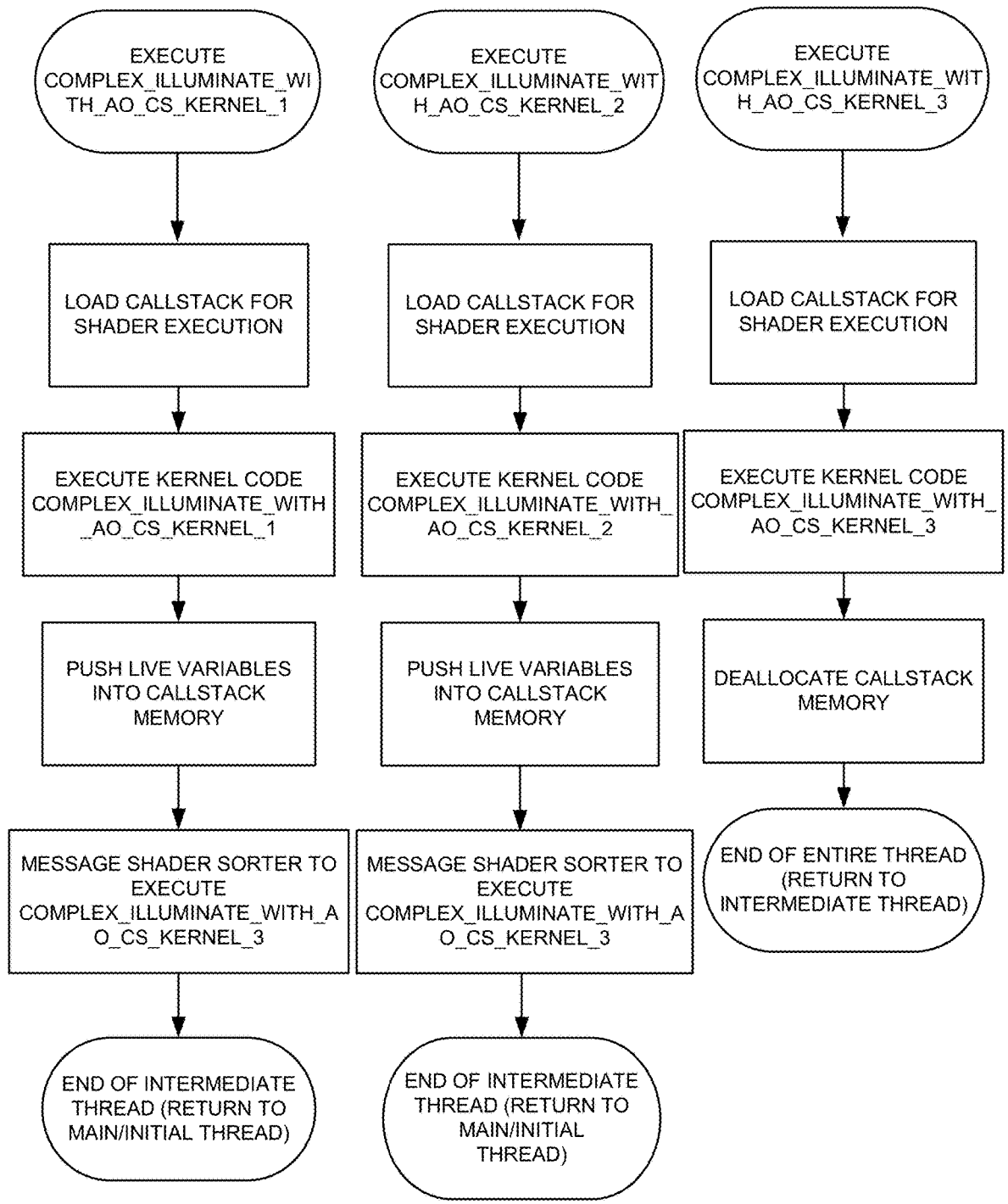

FIGS. 23-25 provide an example of a manner that a main routine can be executed by use of a shader sorter, call stack, and thread scheduler to generate various subroutines from a main routine. In FIG. 23, a thread scheduler invokes an execution unit to execute thread 2400. Depending on whether the branch is satisfied, a subroutine Complex_Illuminate_With_AO_CS_Kernel_1 can be requested for execution by messaging a shader sorter. If the branch is not satisfied, subroutine Complex_Illuminate_With_AO_CS_Kernel_2 can be requested for execution by messaging a shader sorter. In FIG. 24, a shader sorter determines whether a sufficient number of requests are received to fill a SIMD thread with a particular type of request Complex_Illuminate_With_AO_CS_Kernel_n, where n is any of 1-3. If a sufficient number of requests are available or a timer expires or reaches a threshold time, shader sorter requests thread scheduler to schedule execution of the instances of the thread.

FIG. 25 shows execution of threads Complex_Illuminate_With_AO_CS_Kernel_1 ("Kernel 1") and Complex_Illuminate_With_AO_CS_Kernel_2 ("Kernel 2"). After execution of Kernel 1 or Kernel 2, resulting variables are copied or pushed into call stack memory for sharing with the main or calling thread or other threads. Execution of Kernel 1 or Kernel 2 also invoke a subroutine Complex_Illuminate_With_AO_CS_Kernel_3 ("Kernel 3").

In this example, invoking a subroutine Complex_Illuminate_With_AO_CS_Kernel_3 causes a messaging to shader sorter to execute Complex_Illuminate_With_AO_CS_Kernel_3. Shader sorter determines whether a sufficient number of instances of the Kernel 3 are available for execution or a timer has expired or reached a threshold delay and shader sorter requests thread scheduler to perform Kernel 3. Call stack memory can be deallocated and results from Kernel 3 can be written to desired destination in memory.

FIGS. 26A and 26B show generated kernels A-D that can be a representation of Shader Code Example 5. The representations of Shader Code Example 5 can be generated by a compiler, application, or developer. The code kernels A-D can be provided for scheduling for concurrent execution with other instances of the same code kernel.

Shader Code Example 5

```
[_entrypoint]
void IlluminateAlienWithLight(out float3 illumination,
   int TileIndex, int NumLights, int2 screenPosition,
   GBuffer gBuffer, float3 reflection)
{
   for (int i=0; i<NumLights; ++i)
   {
      int LightIndex=Load LightIndex(TileIndex, i);
      LightData lightData=Load LightData(LightIndex);
      //Specialized illumination function which is completely
      //different than IlluminateGBufferPhysicallyBased.
```

```
    //This function executes hundreds of instructions.
    illumination+=AlienMaterialLighting(gBuffer,
      lightData);
  }
  //float3 reflection=CalcReflection( )
  //If reflection was never referenced, it would be con-
    sidered as dead code and will be eliminated.
  illumination+=reflection;
}
[_entrypoint]
void IlluminateGBufferPhysicallyBased(out float3 illumi-
  nation, int TileIndex, int NumLights, int2 screenPosi-
  tion, GBuffer gBuffer, float3 reflection)
{
  for (int i=0; i<NumLights; ++i)
  {
    int LightIndex=Load LightIndex(TileIndex, i);
    LightData lightData=Load LightData(LightIndex);
    //Default illumination code path that handles all light
      types.
    //This function also executes a hundred instructions.
    illumination+=PhysicallyBasedLighting(gBuffer,
      lightData);
  }
  //float3 reflection=CalcReflection( ); Note the code
    here could have been cloned and executed here
    instead of in the primary shader
  illumination+=reflection;
}
[numthreads(16, 16, 1)]
void Complex_Illuminate_With_AO_CS(uint3 threadID:
  SV_DispatchThreadID)
{
  float3 resultColor=0.0;
    GBuffer gBuffer=LoadGBuffer(threadID);
    int TileIndex=CalculateTileIndex(threadID);
    int NumLights=LoadNumCulledLights(TileIndex);
    float3 illumination=0;
    //adding in this term for an extra example
    float3 reflection=CalcReflection( );
    if (gBuffer.IsAlienMaterial)
    {
      Call(IlluminateAlienWithLight(
        illumination,
        TileIndex,
        NumLights,
        threadID,
        lightData,
        gBuffer,
        reflection));
    }
    else
    {
      Call(IlluminateGBufferPhysicallyBased(
        illumination,
        TileIndex,
        NumLights,
        threadID,
        lightData,
        gBuffer,
        reflection));
    }
    illumination+=ApplyAmbientOcclusion(gBuffer);
    IlluminationOutput[screenPosition.xy]=illumination;
}
```

Example of Indirect Dispatch

In an embodiment, allocation of subroutines for parallel execution can occur without use of a shader sorter or call stack. A main entry point of the function can be used to populate append buffers with data used by a subroutine that is desired to be executed. These append buffers are referenced to invoke the subroutine shaders in an indirect manner. For example, data in the append buffers can be pixel data and a number of pixel data entries can correspond to a number of instances of a subroutine to execute in parallel. This embodiment can be used to handle situations that do not need to provide data to another routine or thread.

FIG. 27 depicts an example array of pixels 2702 over which a main shader can be applied. The main shader can branch to subroutine A or subroutine B to process a pixel. A driver can load thread identifiers associated with each of the pixels into append buffers 2704 and 2706. Append buffer 2704 is to be associated with a subroutine A, so that subroutine A will process pixels identified in buffer 2704. Likewise, append buffer 2706 is to be associated with a subroutine B, so that subroutine B will process pixels identified in buffer 2706. In this example, the main shader allocates pixels having coordinates (0,0), (2,0), (3,0), (1,1), and (3,1) for processing by subroutine A by providing thread identifiers associated with each for each pixel to append buffer 2704. ID(0,0), ID(2,0) . . . ID(3,1) represent thread identifiers for pixels (0,0), (2,0) . . . (3,1). In this example, the main shader allocates pixels having coordinates (1,0), (0,1), and (2,1) for processing by subroutine B. Thread identifiers for each pixel allocated for processing by subroutine B can be provided to append buffer 2706. Thread identifiers can be integer values for example associated with each pixel coordinate or thread identifiers can be pixel coordinates.

Figure 28:
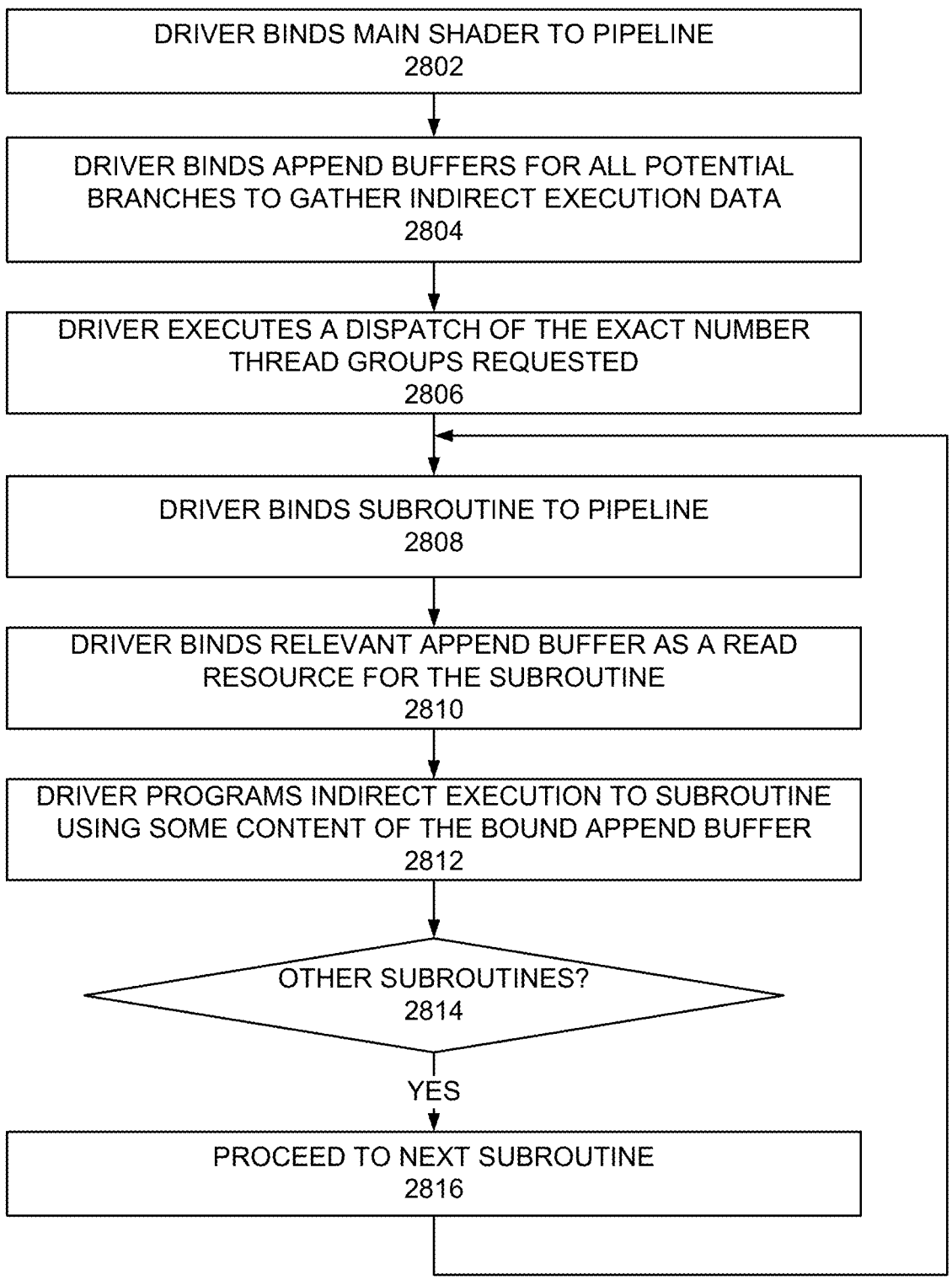
FIG. 28 depicts an example process that can be used by a driver to initialize append buffers for execution of shader subroutines.

FIG. 28 depicts an example process that can be used by a driver to initialize append buffers for execution of shader subroutines. At 2802, a driver for a graphics software stack binds a main shader routine to a graphics pipeline. At 2804, the driver binds append buffers for all potential branched subroutines to gather indirect execution data. At 2806, the driver executes a dispatch of the exact number thread groups requested. For example, a thread count is number of thread groups*thread group size/SIMD lane count. At 2808, the driver binds a branched subroutine. The branched subroutine is a divergent shader branch that can be identified using tag [_entrypoint] or an application or compiler. The subroutine can be executed in parallel with other instances of itself. At 2810, the driver binds an append buffer that stores references to pixels to be processed by the subroutine to the pipeline. At 2812, the driver programs an indirect execution of the subroutine over some of the contents of the reference append buffer. For example, a programmed thread count is number of thread groups*thread group size/SIMD lane count. If the programmed thread count is less than a number of available lanes for a single or multiple SIMD cores, more lanes can be allocated to execute the subroutines, leaving some lanes unused. At 2814, a determination is made as to whether there are other divergent subroutines to process. If so, at 2816, a next divergent subroutine is identified and actions 2808-2812 operate on that divergent subroutine. For example, a next divergent subroutine can another branched subroutine that is capable of execution in parallel with other instances. If no other divergent subroutines are available for processing, the process can end.

Figure 29:
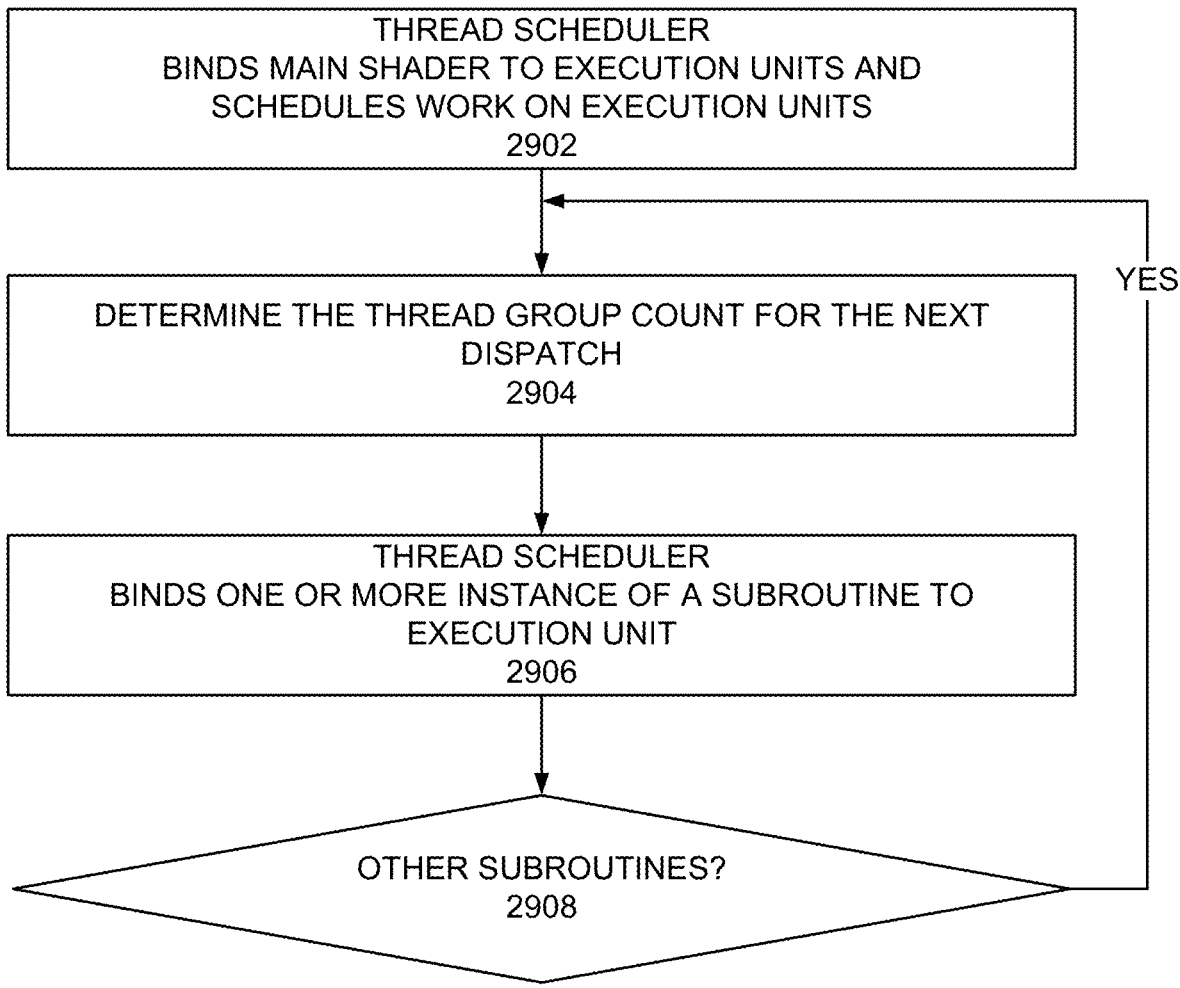
FIG. 29 depicts an example operation of a thread scheduler to dispatch execution of one or more instances of a subroutine based on content to process that is identified in an append buffer.

FIG. 29 depicts an example operation of a thread scheduler to dispatch execution of one or more instances of a subroutine based on content to process that is identified in an append buffer. At 2902, a thread scheduler binds the main shader to one or more execution units and schedules work on the execution units to execute the main shader. At 2904, a thread group count for the next dispatch is determined. For example, the thread group count can be based on results of the indirect data count of content of an append buffer. A number of SIMD lanes to be allocated to execute all of the instances of the subroutine is based on the count. At 2906, the thread scheduler binds one or more instances of the subroutine to the execution unit for execution. The number of SIMD lanes use for execution are those determined in 2904. At 2908, a determination is made by the thread scheduler as to whether there are other subroutines to dispatch for execution. A command streamer can read the "indirect draw" or "indirect dispatch" command. The thread scheduler is told to schedule the work by the command streamer. If there is work to do based of the indirect dispatch/draw count, then the request will get propagated to the thread scheduler to execute the work. If so, then 2904 follows for an undispatched subroutine. Otherwise, the process ends.

Shader Code Example 6 provides an example of use of append buffers and a count of content in each append buffer used to invoke an associated subroutine shader. Indirect dispatch is used to invoke the subroutines and append buffer data is accessed to shader the correct pixels.

Shader Code Example 6

```
RWStructuredBuffer<IlluminateAlienWithLightArgs>
  g_IlluminateAlienWithLightArgs:register(u0);
RWStructuredBuffer<IlluminateGBufferPhysicallyBased
    Args>
  g_IlluminateGBufferPhysicallyBasedArgs:register(u1);
StructuredBuffer<IlluminateAlienWithLightArgs>
  g_IlluminateAlienWithLightArgsRO:register(t0);
StructuredBuffer<IlluminateGBufferPhysicallyBased
    Args>
  g_IlluminateGBufferPhysicallyBasedArgsRO:register
    (t1);
[numthreads(16, 16, 1)]
void Complex_IlluminateCS(uint3 index: SV_Dispatch-
    ThreadID)
{
  float3 resultColor=0.0;
  GBuffer gBuffer=LoadGBuffer(index);
  if (gBuffer.IsAlienMaterial)
  {
    IlluminateAlienWithLightArgs    illuminateAli-
        enWithLightArgs=0;
    illuminateAlienWithLightArgs.ThreadID=index;
    //initialize other parameters needed
    int counterindex=g_IlluminateAlienWithLightArgs.
        IncrementCounter( );
      g_IlluminateAlienWithLightArgs[counterindex]=il-
        luminateAlienWithLightArgs;
  }
  else
  {
    IlluminateGBufferPhysicallyBasedArgs    illuminat-
        eGBufferPhysicallyBasedArgs=0;
    IlluminateGBufferPhysicallyBasedArgs.ThreadID=
        index;
    //initialize other parameters needed
    int counterindex=g_IlluminateGBufferPhysically
        BasedArgs. IncrementCounter( );
      g_IlluminateGBufferPhysicallyBasedArgs[counter-
        index]=IlluminateGBufferPhysicallyBasedArgs;
  }
}
```

Another example shader code is provided below as Shader Code Example 7.

Shader Code Example 7

```
[numthreads(64, 1, 1)]
void IlluminateAlienWithLight(uint3 index: SV_Dis-
    patchThreadID)
{
  IlluminateAlienWithLightArgs
    illuminateAlienWithLightArgs=g_IlluminateAlien
      WithLightArgsRO[index.x];
  GBuffer  gBuffer=LoadGBuffer(illuminateAlienWith-
      LightArgs.ThreadID);
  int     TileIndex=CalculateTileIndex(illuminateAli-
      enWithLightArgs.ThreadID);
  int NumLights=LoadNumCulledLights(TileIndex);
  float3 illumination=0;
  for (int i=0; i<NumLights; ++i)
  {
    int LightIndex=LoadLightIndex(TileIndex, i);
    LightData lightData=Load LightData(LightIndex);
    //This function also executes hundreds of instructions.
    illumination+=AlienMaterialLighting(gBuffer,
        lightData);
  }
  IlluminationOutput[screenPosition.xy]=illumination;
}
[numthreads(64, 1, 1)]
float3 IlluminateGBufferPhysicallyBased(uint3 index:
    SV_DispatchThreadID)
{
  IlluminateGBufferPhysicallyBasedArgs
    illuminateGBufferPhysicallyBasedArgs=g_
      IlluminateGBufferPhysicallyBasedArgsRO[in-
      dex.x];
  GBuffer  gBuffer=LoadGBuffer(illuminateGBuffer-
      PhysicallyBasedArgs.ThreadID);
  int  TileIndex=CalculateTileIndex(illuminateGBuffer-
      PhysicallyBasedArgs.ThreadID);
  int NumLights=LoadNumCulledLights(TileIndex);
  float3 illumination=0;
  for (int i=0; i<NumLights; ++i)
  {
    int LightIndex=LoadLightIndex(TileIndex, i);
    LightData lightData=Load LightData(LightIndex);
    //Default illumination code path that handles all light
        types. This function also executes a hundred
        instructions.
    illumination+=PhysicallyBasedLighting(gBuffer,
        lightData);
  }
  IlluminationOutput[screenPosition.xy]=illumination;
}
```

An API (in C++) to invoke use of append buffers to invoke a subroutine shader could be the following:

```
void     SoftwareSolutionIlluminationShader::Initialize
    (const char*pShaderFilenameName, Device*pDevice,
    ShaderCompiler*pCompiler)
{
  pCompiler->CompilerShader(pShaderName,   "Com-
      plex_IlluminateCS", pDevice, &m_IlluminationEn-
      tryPoint);
```

```
pCompiler->CompilerShader(pShaderName, "Illumi-
    nateAlienWithLight", pDevice, &m_IlluminateAli-
    enWithLight);
pCompiler->CompilerShader(pShaderName, "Illumi-
    nateGBufferPhysicallyBased", pDevice, &m_Illu-
    minateGBufferPhysicallyBased);
m_IlluminateAlienWithLightArgsBuffer=
    CreateIlluminateAlienWithLightArgs(pDevice);
m_IlluminateAlienWithLightArgsBufferSRV=m_
    IlluminateAlienWithLightArgsBuffer->Create
    SRV( );
m_IlluminateAlienWithLightArgsBufferUAV=m_
    IlluminateAlienWithLightArgsBuffer->Create
    UAV( );
m_IlluminateGBufferPhysicallyBasedArgsBuffer=
    CreateIlluminateGBufferPhysicallyBasedArgs(pDe-
    vice);
m_IlluminateGBufferPhysicallyBasedArgsBuffer
    SRV=m_IlluminateGBufferPhysicallyBasedArgs
    Buffer->CreateSRV( );
m_IlluminateGBufferPhysicallyBasedArgsBuffer
    UAV=m_IlluminateGBufferPhysicallyBasedArgs
    Buffer->CreateUAV( );
}
void        SoftwareSolutionIlluminationShader::Render
    (DeviceContext*pDeviceContext)
{
    pDeviceContext->SetCS(m_IlluminationEntryPoint);
    pDeviceContext->SetShaderResourceViews( . . . );
    pDeviceContext->SetConstants( . . . );
    pDeviceContext->SetUnorderedAccessViews({m_Il-
        luminateAlienWithLightArgsBufferUAV, m_Illumi-
        nateGBufferPhysicallyBasedArgsBufferUAV});
    pDeviceContext->Dispatch(m_ThreadGroupCountX,
        m_ThreadGroupCountY, 1);
    pDeviceContext->SetCS(m_IlluminateAlienWith-
        Light);
    pDeviceContext->SetShaderResourceViews(m_Illu-
        minateAlienWithLightArgsBufferSRV);
    pDeviceContext->DispatchIndirect(m_IlluminateAli-
        enWithLightArgsBuffer->GetCounterResource(   );
        //count of threadIDs in Append Buffer
    pDeviceContext->SetCS(m_IlluminateGBufferPhysi-
        callyBased);
    pDeviceContext->SetShaderResourceViews(m_Illu-
        minateGBufferPhysicallyBasedArgsBufferSRV);
    pDeviceContext->DispatchIndirect(m_Illuminat-
        eGBufferPhysicallyBasedArgsBuffer->GetCounter-
        Resource( );
}
```

Figure 30:
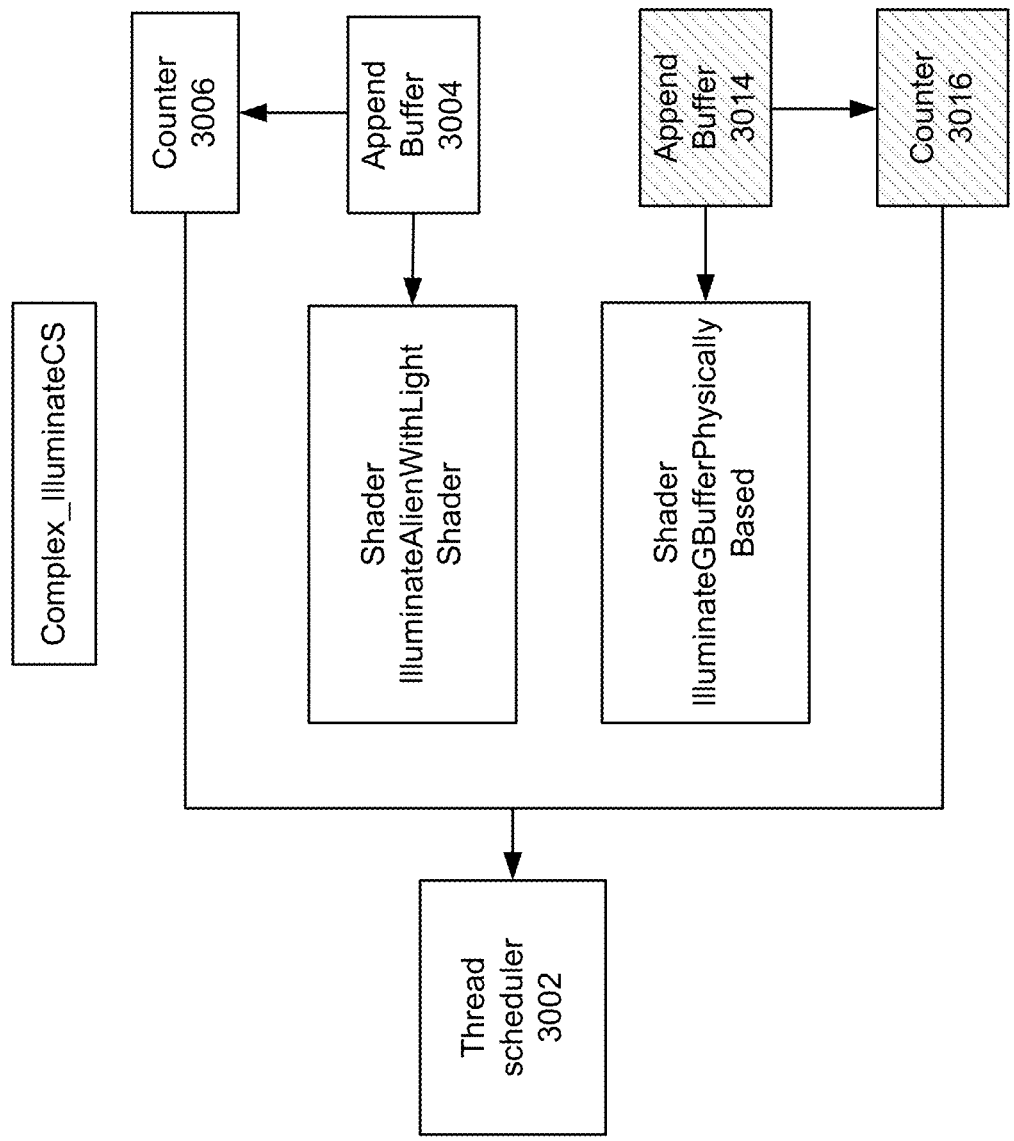
FIG. 30 depicts an example that shows indirect dispatch of threads.

FIG. 30 depicts an example that shows execution of the Shader Code Examples 6 and 7. Thread scheduler 3002 schedules execution of main routine Complex_IlluminateCS by an execution unit. Append buffer 3004 stores identifiers for pixels to be processed by subroutine IlluminateAlienWithLight. Append buffer 3014 stores identifiers for pixels to be processed by subroutine IlluminateGBufferPhysicallyBased. For example, an identifier for a pixel can be a thread identifier. Counter 3006 counts a number of pixels to be processed by subroutine IlluminateAlienWithLight. The number of pixels to be processed by subroutine IlluminateAlienWithLight can correspond to a number of instances of subroutine IlluminateAlienWithLight to execute, namely one instance for each pixel. Counter 3016 counts a number of pixels to be processed by subroutine IlluminateGBufferPhysicallyBased. The number of pixels to be processed by subroutine IlluminateGBufferPhysically-Based can correspond to a number of instances of subroutine IlluminateGBufferPhysicallyBased to execute, namely one instance for each pixel.

Thread scheduler 3002 schedules execution of instances of subroutines IlluminateAlienWithLight and IlluminateGBufferPhysicallyBased based on the counts in respective counter 3006 and counter 3016. For example, if counter 3006 stores a count of 200, then for a 64×1×1 thread group, 4 thread groups are launched using SIMD64 cores. Thread scheduler 3002 schedules 256 lanes from use of 4 SIMD64 cores (4*64) to execute the 200 instances of subroutine IlluminateAlienWithLight. Accordingly, 56 lanes may be unused or masked off from use.

If counter 3016 stores a count of 56, then for a 64×1×1 thread group, 1 thread group is launched using a SIMD64 core. Thread scheduler 3002 schedules 56 lanes from use of 1 SIMD64 core to execute the 56 instances of subroutine IlluminateGBufferPhysicallyBased. Accordingly, 8 lanes may be unused or masked off from use.

Figure 31A:
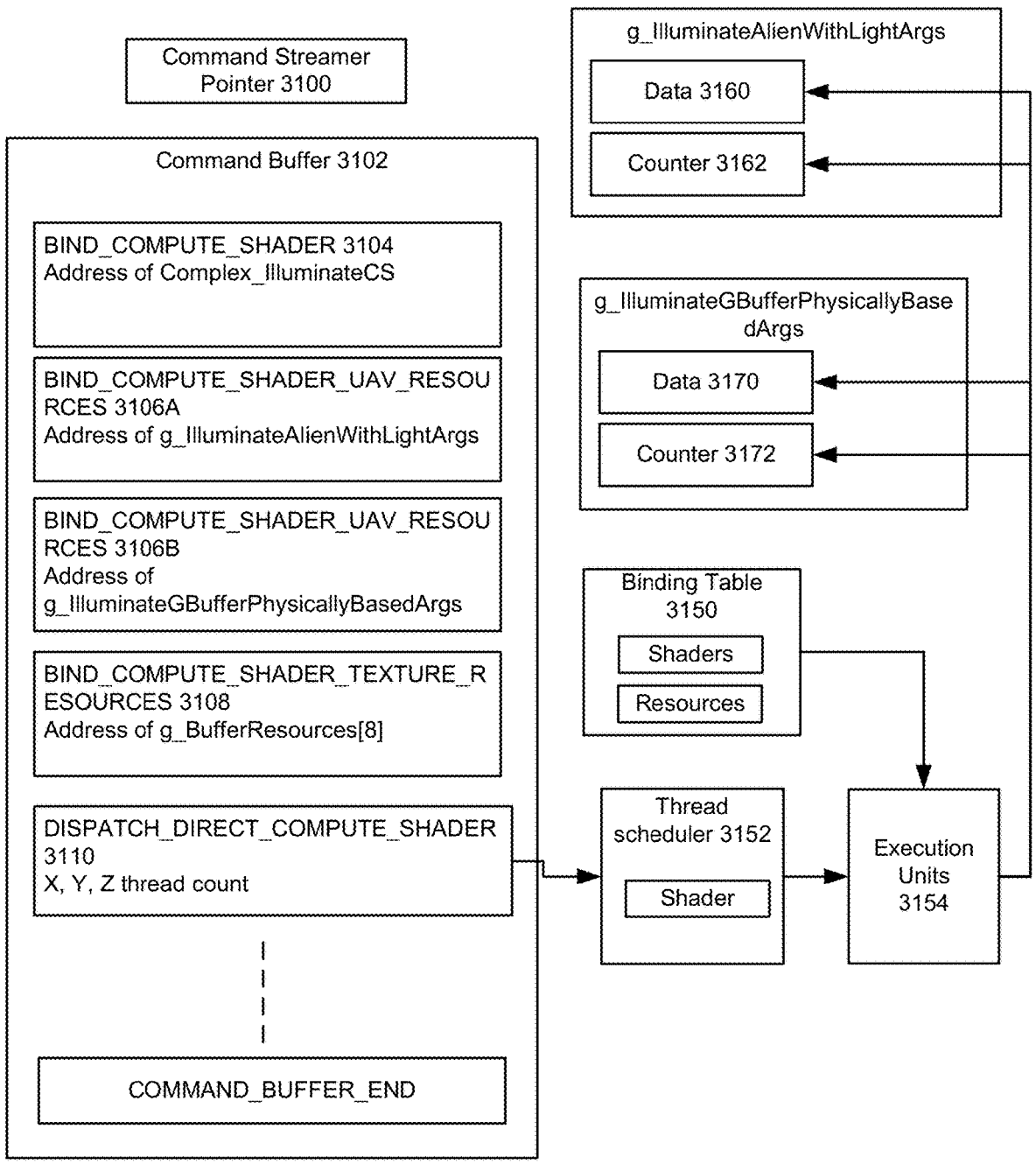
FIGS. 31A-31C depict examples that show indirect dispatch of threads.
Figure 31B:
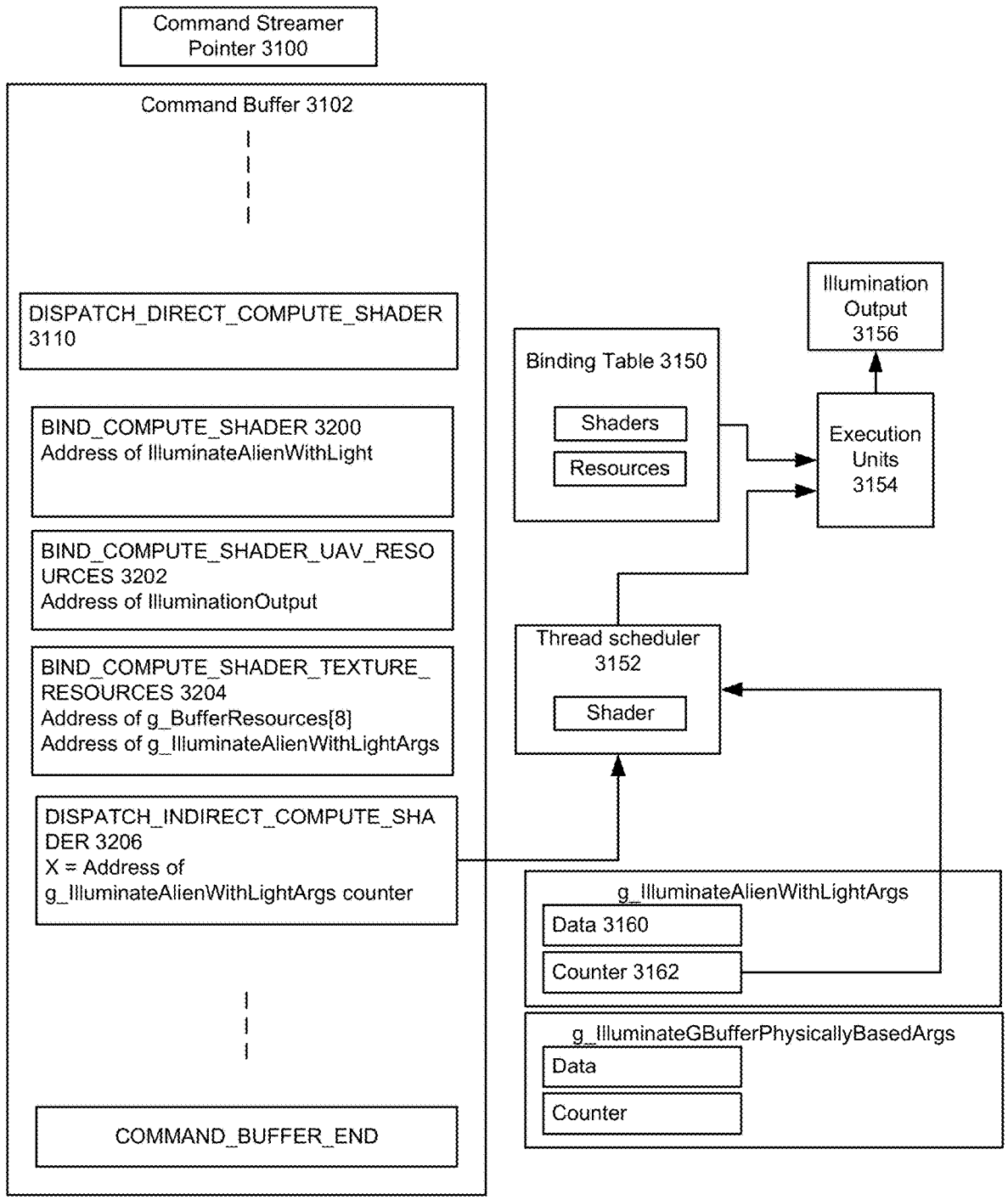
Figure 31C:
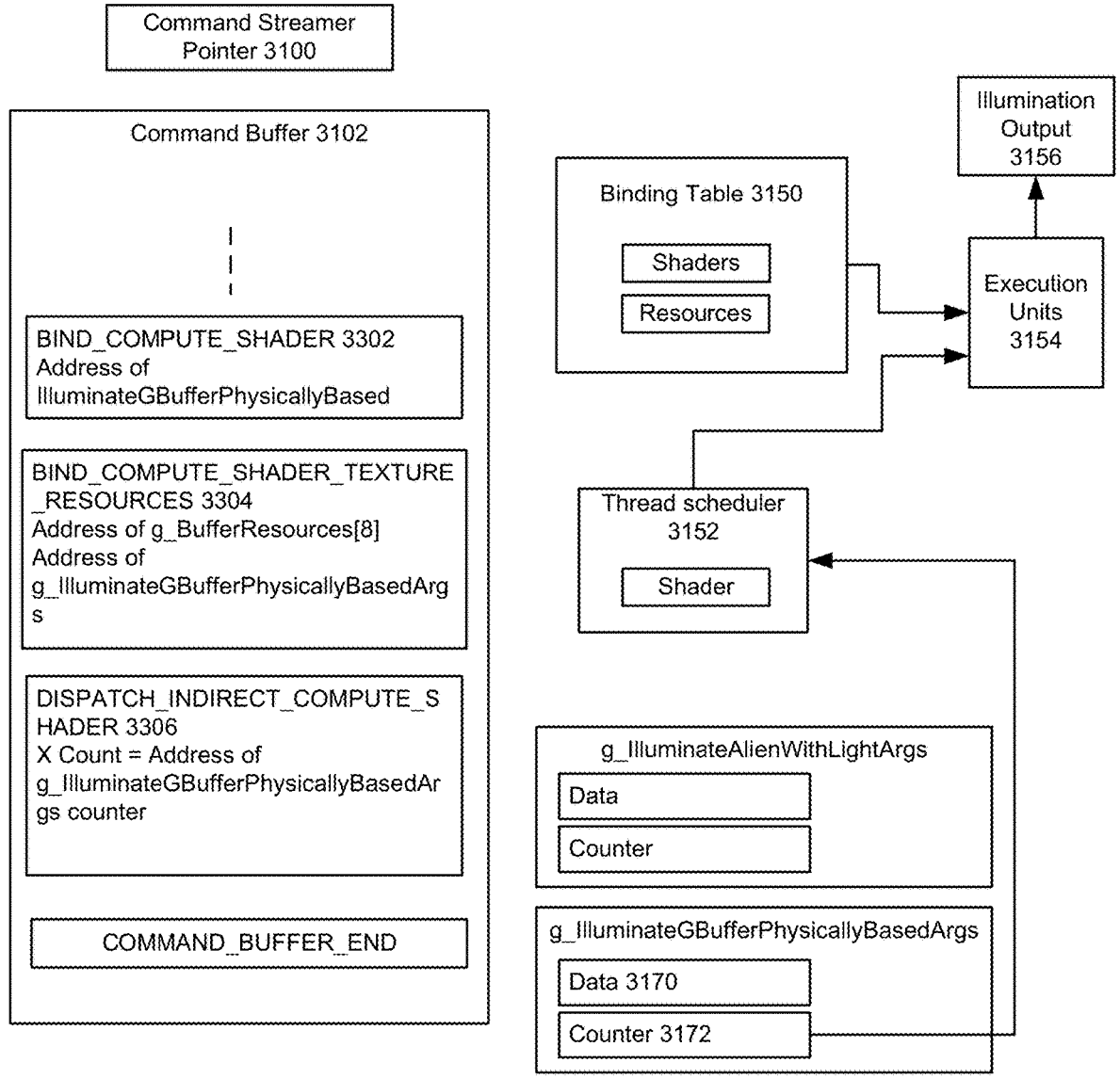

FIGS. 31A-31C depict an example that shows execution of the Shader Code Examples 6 and 7. For example, for a 1920×1080 pixel surface, there are 2,073,600 compute threads. For a thread group size of 16×16×1, an API level dispatches 120×68×1 thread groups.

FIG. 31A shows an example of direct dispatch of shader kernels where a driver specifies a number of threads to execute. In response to a draw call, a graphics driver executed by a processor (e.g., CPU) can form commands in command buffer 3102. A command streamer pointer 3100 can point to a current command in command buffer 3102 to execute. Command BIND_COMPUTE_SHADER 3104 can bind to thread scheduler 3152 a memory address of kernel Complex_IlluminateCS for execution. Command BIND_COMPUTE_SHADER_UAV_RESOURCES 3106A-3106B can bind respective memory addresses of kernels g_IlluminateAlienWithLightArgs, g_IlluminateGBufferPhysicallyBasedArgs into slots of binding table 3150. Command BIND_COMPUTE_SHADER_TEXTURE_RESOURCES 3108 can bind an address of g_BufferResources[8] into slots of binding table 3150.

Execution of command DISPATCH DIRECT_COMPUTE_SHADER 3110 can dispatch 120×68×1 threads of Complex_IlluminateCS (over a 1920×1080 pixel surface) to determine a number of pixels to be processed by g_IlluminateAlienWithLightArgs and a number of pixels to be processed by g_IlluminateGBufferPhysicallyBasedArgs.

Thread scheduler 3152 can schedule execution of threads of Complex_IlluminateCS with reference to resources and shaders referenced in binding table 3150. Thread scheduler 3152 can request execution units 3154 to perform the threads using a determined number of lanes that can execute all dispatched threads in parallel. Execution units 3154 can provide outputs from the execution of Complex_IlluminateCS into data register 3160 and counter register 3162 of g_IlluminateAlienWithLightArgs that indicate respective pixels (by threadID) to process and number of instances of g_IlluminateAlienWithLightArgs to execute. Also, execution units 3154 can provide outputs from the execution of Complex_IlluminateCS into data register 3170 and counter register 3172 of g_IlluminateGBufferPhysicallyBasedArgs that indicate respective pixels (by threadID) to process and number of instances of g_IlluminateGBufferPhysically-BasedArgs to execute.

FIG. 31B provides an example where a number of instances of routine g_IlluminateAlienWithLightArgs is dispatched using reference to a counter. Command BIND_COMPUTE_SHADER 3200 can bind to thread scheduler 3152 a memory address of kernel IlluminateAlienWithLight for execution. Execution of command BIND_COMPUTE_SHADER_UAV_RESOURCES 3202 provides an address of kernel IlluminationOutput and is bound to binding table 3150. Execution of command BIND_COMPUTE_SHADER_TEXTURE_RESOURCES 3204 provides an address of g_BufferResources[8] and an address of g_IlluminateAlienWithLightArgs for binding into slots of binding table 3150. Execution of DISPATCH_INDIRECT_COMPUTE_SHADER 3206 causes dispatch of a number of instances of g_IlluminateAlienWithLightArgs where the number of instances is specified by variable X, which references an address of g_IlluminateAlienWithLightArgs counter 3162. Data register 3160 stores identifiers for pixels to be processed by subroutine g_IlluminateAlienWithLightArgs. For example, an identifier for a pixel can be a thread identifier. Counter 3162 counts a number of pixels to be processed by subroutine g_IlluminateAlienWithLightArgs. The number of pixels to be processed by subroutine g_IlluminateAlienWithLightArgs can correspond to a number of instances of subroutine g_IlluminateAlienWithLightArgs to execute, namely one instance for each pixel.

Thread scheduler 3152 can schedule execution of the any bound shaders with reference to resources and shaders referenced in binding table 3150. Execution units 3154 can execute number instances of shaders indicated in counter 3162.

IlluminationOutput 3156 provides an address for output from shader g_IlluminateAlienWithLightArgs.

FIG. 31C provides an example where a number of instances of routine g_IlluminateGBufferPhysicallyBasedArgs is dispatched using reference to a counter. Execution of command 3302 can bind a kernel of IlluminateGBufferPhysicallyBased to thread scheduler 3152. Execution of command BIND_COMPUTE_SHADER_TEXTURE_RESOURCES 3304 can bind addresses of g_BufferResources [8] and g_IlluminateGBufferPhysicallyBasedArgs into binding table 3150. Execution of command DISPATCH_INDIRECT_COMPUTE_SHADER 3306 causes thread scheduler 3152 to access an address X that references a location of counter 3172. Counter 3172 provides a count of a number of pixels to be processed by subroutine g_IlluminateGBufferPhysicallyBasedArgs. The number of pixels to be processed by subroutine g_IlluminateGBufferPhysicallyBasedArgs can correspond to a number of instances of subroutine g_IlluminateGBufferPhysicallyBasedArgs to execute, namely one instance for each pixel.

Thread scheduler 3152 can schedule execution of the any bound shaders with reference to resources and shaders referenced in binding table 3150. Execution units 3154 can execute number instances of shaders indicated in counter 3172. IlluminationOutput 3156 provides an address for output from shader g_IlluminateGBufferPhysicallyBasedArgs.

In an embodiment, the shader compiler of the graphics software stack could detect long divergent branches and move them into separate callable functions. This would allow embodiments to work on shaders authored before the [_entrypoint] syntax and call stack flow is available.

In an embodiment, embodiments can be used to implement virtual function calls on the GPU. The virtual function call will end up as callable function within the function table. Control flow can be implemented by using the GPU call stack mechanism.

A "shader" can refer to any shader stage in the graphics pipeline, including pixel shaders, compute shaders, vertex shader, hull shaders, domain shaders, geometry shaders, ray tracing shaders, or any generic shader execution. Various embodiments can be used in more than deferred shading. Various embodiments can be used for identifying and scheduling execution of divergent branches within SIMD lanes.

Execution of one or more subroutines in parallel can also include execution of parallel control flow. Accordingly, a "subroutine" can include, but is not limited to, any called routine, any routine called by a subroutine, or any control flow instructions. Control flow instructions can include any instructions such as code blocks for: "if" condition satisfaction determinations, "else if" condition satisfaction determinations, "else" condition satisfaction determinations, routine switching statements (e.g., calling another routine or returning to a routine), loops, or "while" condition loops.

For example, in the code example below (Code Example 8), any or all of "if(conditionA)", "Call(FunctionA( ))", "Else if(conditionB)", "Call(FunctionB( ))", "Else if(conditionC)", "Call(FunctionC( ))", "else", or "Call(FunctionDefault( ))" can be executed in parallel with other instances of the same code.

Code Example 8

```
Void MultiBranchCS( )
{
if(conditionA)
{
   Call(FunctionA( );
}
Else if(conditionB)
{
   Call(FunctionB( );
}
Else if(conditionC)
{
   Call(FunctionC( );
}
. . .
else
{
   Call(FunctionDefault( );
}
}
```

The components and features of a computing platform may be implemented using any combination of discrete circuitry, ASICs, field programmable gate arrays (FPGAs), logic gates and/or single chip architectures. Further, the features of any embodiment may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

The appearances of the phrase "one example" or "an example" are not necessarily all referring to the same example or embodiment. Any aspect described herein can be combined with any other aspect or similar aspect described herein, regardless of whether the aspects are described with respect to the same figure or element.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a memory device;
processors including a plurality of single instruction multiple data (SIMD) processors;
circuitry to dispatch at least one thread for execution by at least a portion of the processors, wherein:
the at least one thread comprises a first shader,
execution of the first shader is to cause access to a buffer that identifies pixel data and a counter value associated with a first subroutine,
in response to a request to perform the first subroutine, the circuitry is to dispatch for execution the first subroutine with a number of other instances of the first subroutine based on the counter value, and
the first subroutine and the number of other instances of the first subroutine are to process identified pixel data.

2. The apparatus of claim 1, wherein the instances of the first subroutine comprise other instances of the first subroutine as called by one or more routines.

3. The apparatus of claim 1, wherein the memory device is to store a call stack and the call stack is to store information from the first shader and used by the first subroutine.

4. The apparatus of claim 1, wherein the memory device is to store the buffer that identifies the pixel data and the counter value, wherein the counter value is to identify a number of instances of the first subroutine to execute in parallel.

5. The apparatus of claim 1, wherein the first shader comprises a second subroutine that is an alternate branch from the first subroutine and further comprising a processor to execute a compiler to identify the first subroutine based at least in part on lines of code in the first subroutine, level of use of registers by the first subroutine, and a level of difference from the second subroutine.

6. The apparatus of claim 1, wherein the first subroutine comprises one or more of: a subroutine, a routine called by a subroutine, or control flow.

7. The apparatus of claim 1, wherein a number of executed instances of the first subroutine is specified by the counter value.

8. At least one non-transitory computer-readable medium comprising instructions stored thereon, that if executed by at least one processor, cause the at least one processor to:
analyze a first shader to determine any branch with two divergent subroutines, the two divergent subroutines comprising a first subroutine and a second subroutine;
associate the first subroutine with identifiers of a first group of one or more pixels and a first count value and associate the second subroutine with identifiers of a second group of one or more pixels and a second count value;

execute the first subroutine in parallel with a number of instances of the first subroutine based on the first count value; and execute the second subroutine in parallel with a number of instances of the second subroutine based on the second count value.

9. The at least one computer-readable medium of claim 8, wherein:

the number of instances of the first subroutine comprise instances of the first subroutine as called by one or more routines and the number of instances of the second subroutine comprise instances of the second subroutine as called by one or more routines.

10. The at least one computer-readable medium of claim 8, further comprising instructions stored thereon, that if executed by at least one processor, cause the at least one processor to:

store a call stack, the call stack to store one or more of: information from the first shader and used by the first subroutine or information from the first shader and used by the second subroutine.

11. The at least one computer-readable medium of claim 8, wherein to determine any branch with two divergent subroutines, the two divergent subroutines comprising a first subroutine and a second subroutine, the at least one processor is to:

identify the first subroutine based at least in part on lines of code in the first subroutine, level of use of registers by the first subroutine, and a level of difference from the second subroutine and identify the second subroutine based at least in part on lines of code in the first subroutine, level of use of registers by the first subroutine, and a level of difference from the first subroutine.

12. The at least one computer-readable medium of claim 8, wherein:

the first subroutine comprises one or more of: a subroutine, a routine called by a subroutine, or control flow and the second subroutine comprises one or more of: a subroutine, a routine called by a subroutine, or control flow.

13. The at least one computer-readable medium of claim 8, further comprising instructions stored thereon, that if executed by at least one processor, cause the at least one processor to:

store the identifiers of the first group of one or more pixels and the first count value into memory and store the identifiers of the second group of one or more pixels and the second count value into the memory.

14. The at least one computer-readable medium of claim 8, wherein:

a number executions of the first subroutine in parallel with the number of instances of the first subroutine is specified by the first count value and a number executions of the second subroutine in parallel with the number of instances of the second subroutine is specified by the second count value.

15. A system comprising:

at least one memory;

at least one processor; and at least one graphics processing unit communicatively coupled to the at least one memory and to the at least one processor, wherein:

the at least one processor is to:

request execution of a shader to process data stored in the at least one memory using a portion of the at least one graphics processing unit, the shader comprising a first subroutine;

access a buffer that identifies pixel data and a counter value associated with the first subroutine; and dispatch execution of the first subroutine in parallel with a number of other instances of the first subroutine based on the counter value using a portion of the at least one graphics processing unit.

16. The system of claim 15, further comprising one or more of:

a network interface communicatively coupled to the at least one processor, a display device communicatively coupled to the at least one processor, or a power supply source communicatively coupled to the at least one processor.

17. The system of claim 15, wherein the at least one processor comprises a multi-lane Single Instruction, Multiple Data (SIMD) processor.

18. The system of claim 15, wherein the other instances of the first subroutine comprise other instances of the first subroutine as called by one or more routines.

19. The system of claim 15, wherein a number of executed instances of the first subroutine is specified by the counter value.

* * * * *